United States Patent
Neutsch

(10) Patent No.: US 10,562,340 B2
(45) Date of Patent: Feb. 18, 2020

(54) WHEEL UNIT

(71) Applicant: Gustav Magenwirth GmbH & Co. KG, Bad Urach (DE)

(72) Inventor: Christian Neutsch, Reutlingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 372 days.

(21) Appl. No.: 15/358,890

(22) Filed: Nov. 22, 2016

(65) Prior Publication Data
US 2017/0151829 A1 Jun. 1, 2017

(30) Foreign Application Priority Data
Nov. 27, 2015 (DE) .................. 10 2015 120 657

(51) Int. Cl.
| | |
|---|---|
| B60B 27/02 | (2006.01) |
| B60B 1/00 | (2006.01) |
| B60T 8/171 | (2006.01) |
| B60T 8/17 | (2006.01) |
| B62L 3/02 | (2006.01) |
| B60T 8/32 | (2006.01) |
| G01P 3/488 | (2006.01) |
| B62L 1/00 | (2006.01) |
| B60B 27/00 | (2006.01) |
| B62M 6/40 | (2010.01) |
| B62J 99/00 | (2020.01) |

(Continued)

(52) U.S. Cl.
CPC .......... B60B 1/003 (2013.01); B60B 27/0052 (2013.01); B60B 27/0068 (2013.01); B60B 27/023 (2013.01); B60T 8/171 (2013.01); B60T 8/1706 (2013.01); B60T 8/329 (2013.01); B62L 1/005 (2013.01); B62L 3/023 (2013.01); B62M 6/40 (2013.01); G01P 3/488 (2013.01); B60T 8/3225 (2013.01); B62J 2099/002 (2013.01); B62K 3/02 (2013.01); B62K 25/00 (2013.01)

(58) Field of Classification Search
CPC . B60B 1/003; B60B 27/0052; B60B 27/0068; B60B 27/023; B60T 8/171; B60T 8/329; B62L 1/005; B62L 3/023; B62M 6/40; G01P 3/488
USPC ..................................... 180/206.3
See application file for complete search history.

(56) References Cited

U.S. PATENT DOCUMENTS

| | | | | |
|---|---|---|---|---|
| 6,492,805 | B1 * | 12/2002 | Wakabayashi | B60T 1/065 |
| | | | | 324/160 |
| 7,454,961 | B2 * | 11/2008 | Pirone | G01D 5/147 |
| | | | | 73/114.26 |
| 9,199,687 | B2 * | 12/2015 | Takatsuka | B62K 21/02 |

(Continued)

FOREIGN PATENT DOCUMENTS

| | | |
|---|---|---|
| DE | 199 15 215 A1 | 10/2000 |
| DE | 60 2005 003 495 T2 | 11/2008 |

(Continued)

*Primary Examiner* — Jacob D Knutson
(74) *Attorney, Agent, or Firm* — Reinhart Boemer Van Deuren P.C.

(57) ABSTRACT

In order to improve a wheel unit for a bicycle, comprising a hub and a wheel rim, which is arranged rotatably about an axis of rotation, wherein the hub and the wheel rim are connected to one another by spokes, it is proposed to arrange a brake disc and a sensor ring, which comprises a sensing region, on the hub and to position the sensing region between the brake disc and the spokes.

38 Claims, 18 Drawing Sheets

(51) Int. Cl.
 *B62K 3/02* (2006.01)
 *B62K 25/00* (2006.01)

(56) References Cited

U.S. PATENT DOCUMENTS

| | | | |
|---|---|---|---|
| 2008/0111342 | A1 | 5/2008 | Niekerk et al. |
| 2013/0026731 | A1* | 1/2013 | Mikura ............... B60B 27/0068 280/279 |
| 2013/0319802 | A1* | 12/2013 | Burgoon ................ B60T 8/329 188/218 XL |
| 2014/0175857 | A1* | 6/2014 | Mori .................... B60T 8/1706 301/6.8 |
| 2015/0344009 | A1 | 12/2015 | Hagspiel et al. |
| 2017/0269116 | A1* | 9/2017 | Takatsuka ................. G01P 3/44 |
| 2018/0031595 | A1* | 2/2018 | Yasuhara .................. B62L 3/08 |
| 2018/0136248 | A1* | 5/2018 | Tomura .................. G01P 1/026 |

FOREIGN PATENT DOCUMENTS

| | | |
|---|---|---|
| DE | 102010038525 A1 | 2/2012 |
| EP | 1 580 109 B1 | 11/2007 |
| EP | 2 749 465 A1 | 7/2014 |
| WO | WO 2014/108235 A1 | 7/2014 |

\* cited by examiner

XII - XII

WHEEL UNIT

CROSS-REFERENCE TO RELATED PATENT APPLICATION

This patent application claims the benefit of German application No. 10 2015 120 657.9, filed Nov. 27, 2015, the teachings and disclosure of which are hereby incorporated in their entirety by reference thereto.

BACKGROUND OF THE INVENTION

The invention relates to a wheel unit for a bicycle, comprising a hub and a wheel rim, which is arranged rotatably about an axis of rotation, wherein the hub and the wheel rim are connected to one another by spokes.

Wheel units of this type for bicycles are known from the prior art.

These wheel units are configured for the demands placed on a bicycle, as will be specified by way of example hereinafter, and in particular the wheel units for the bicycle are mountable on a bicycle.

The bicycle comprises a front wheel unit and a rear wheel unit, wherein the wheel units are connected to a frame.

In conjunction with this disclosure, a bicycle is understood to mean a vehicle which is driven only by the muscle power of a rider or which can be driven by the muscle power of the rider and comprises an auxiliary drive which in particular operates in a manner free from exhaust gas, for example without $CO_2$ emission, wherein the auxiliary drive in particular supplements the drive by human muscle power and/or replaces this, for example in phases, in particular in the case of sections of a route that are very tiring for the rider.

The auxiliary drive comprises in particular an electric drive motor, which is preferably fed with electrical energy from a power store or from a fuel cell.

By way of example, the auxiliary drive and therefore in particular also the bicycle does not require any fossil fuels in order to be driven.

The term "bicycle" in the sense used herein therefore in particular includes bicycles which are drivable only by the muscle power of the rider and also bicycles which are drivable for example by the muscle power of the rider and which have a permanently operating or connectable auxiliary drive, for example e-bikes and pedelecs, that is to say electrically driven bicycles.

In particular, bicycles of this type reach maximum speeds of at most 100 km/h, for example at most 80 km/h, in particular at most 60 km/h, in particular at most 40 km/h.

The bicycle and therefore in particular also the wheel unit for the bicycle is thus of a lightweight construction for such a maximum speed.

In addition, bicycles in the sense used herein are lightweight vehicles weighing for example at most 100 kg, in particular at most 80 kg, particularly expediently at most 50 kg, in particular at most 30 kg, such that the wheel unit is designed to be loaded by a maximum weight of this type plus the weight of the rider.

The object of the invention is to improve a wheel unit of the above general type for a bicycle.

SUMMARY OF THE INVENTION

This object is achieved in the case of a wheel unit according to the invention of the type described in the introduction in that a brake disc and a sensor ring, which comprises a sensing region, are arranged on the hub, and in that the sensing region is positioned between the brake disc and the spokes.

The wheel unit is thus be brakable by means of the brake disc, and the additional arrangement of the sensor ring on the wheel unit offers the advantage that a rolling property of the wheel unit, in particular the rotational speed, for example of a wheel of the wheel unit, is detectable by means of the sensor ring, in particular the sensing region of the sensor ring.

A further advantage of the wheel unit according to the invention is the fact that, due to the arrangement of the sensing region between the brake disc and the spokes, an installation space between the brake disc and the spokes is utilised in a favourable manner and it is thus made possible to additionally arrange the sensor ring on the wheel unit for bicycles, even though, in the case of wheel units of the above general type, there is at most only a limited amount of free installation space available on account of the design of said wheel units for bicycles and the resultant requirements.

In the case of the wheel unit according to the invention, due to the arrangement of the sensor ring between the brake disc and the spokes, a further advantage which is achieved is the fact that the brake disc is mountable on the wheel unit in accordance with the usual standardisations in the bicycle sector, for example, with regard to the positioning thereof, in a direction that is axial relative to the axis of rotation and/or for example, in respect of the extent of the wheel unit, in the direction that is axial relative to the axis of rotation.

With regard to the configuration of the brake disc, no further details have been given before now.

By way of example, the brake disc extends substantially in a brake disc plane which runs perpendicularly to a brake disc axis and which is defined for example by a brake ring arranged on the brake disc.

The brake disc advantageously comprises a mounting ring, by means of which the brake disc is mountable on the hub, and in particular the mounting ring defines the brake disc plane.

In particular, supporting bars of the brake disc carry the brake ring of the brake disc, and the supporting bars advantageously connect the brake ring to the mounting ring of the brake disc.

With regard to the configuration of the spokes, no further details have been given before now.

In particular, some of the spokes are fastened to a first annular collar of the hub and some of the spokes are fastened to a second annular collar of the hub, wherein in particular the same number of spokes are fastened to the first annular collar of the hub and to the second annular collar of the hub.

Here, the spokes are arranged substantially in a spoke surface, wherein the spoke surface is composed in particular of a first spoke surface and a second spoke surface, and the first spoke surface extends, starting from the first annular collar of the hub, to the wheel rim in the direction that is radial relative to the axis of rotation and the second spoke surface extends, starting from the second annular collar of the hub, to the wheel rim in the direction that is radial relative to the axis of rotation, and the first spoke surface and the second spoke surface meet one another in the region of the wheel rim.

Here, the first spoke surface and the second spoke surface, particularly in the region of the axis of rotation, are spaced from one another in the direction that is axial relative to the axis of rotation and converge towards one another in the direction that is radial relative to the axis of rotation, such that the first spoke surface and the second spoke surface are conical.

With regard to the arrangement and configuration of the sensor ring and of the sensing region, no further details have been given before now.

In a particularly advantageous embodiment, provision is made that the brake disc extends substantially in the brake disc plane and the spokes run substantially in the spoke surface, wherein the sensing region is arranged between the brake disc plane and the spoke surface, in particular in the direction that is axial relative to the axis of rotation.

It is particularly favourable if the sensor ring is arranged on the hub between the brake disc plane and the spoke surface, in particular in the direction that is axial relative to the axis of rotation, and therefore the installation space available there is utilised in an expedient manner.

In addition, the sensor ring is advantageously arranged in a similar region to the sensing region, in particular in relation to the direction that is axial relative to the axis of rotation, such that a design of simple structure is made possible.

The sensor ring advantageously extends substantially in a sensor ring plane which runs perpendicularly to a sensor ring axis, wherein a sensor ring extending substantially in a sensor ring plane is to be understood in particular to mean that an inner region of the sensor ring, for example a mounting ring of the sensor ring, extends in the sensor ring plane and in particular a large part of the sensor ring extends in the sensor ring plane.

Here, the sensor ring axis is oriented in particular coaxially with the axis of rotation.

In an advantageous embodiment the sensing region runs in the sensor ring plane.

Here, the sensing region of the sensor ring advantageously takes up only an extremely small amount of installation space in the direction that is axial relative to the axis of rotation and therefore is positionable between the spokes and the brake disc in a favourable manner.

Here, provision is made particularly favourably that the sensing region extends substantially in the direction that is radial relative to the axis of rotation and in a peripheral direction around the axis of rotation.

Provision is made in a further particularly advantageous embodiment that the sensing region runs transversely to the sensor ring plane and in so doing forms a region that is detectable particularly easily.

By way of example, the sensing region is formed in a strip-like manner, wherein the broad side of the strip-like sensing region advantageously runs transversely, in particular substantially perpendicularly, to the sensor ring plane and/or the elongate extent of the sensing region, which for example is strip-like, particularly expediently runs in the peripheral direction around the axis of rotation and/or the sensing region particularly advantageously has its shortest extent in the direction that is radial relative to the axis of rotation.

In a particularly preferred embodiment, the sensor ring stands out from the sensor ring plane in the sensing region.

Here, a part of the sensor ring running transversely to the sensor ring plane stands out from the sensor ring plane in the sensing region, for example.

In a particularly favourable embodiment, provision is made that the sensor ring, in the sensing region, has a thickness which is based on the extent of the sensor ring in the direction that is axial relative to the axis of rotation and which is thicker than a thickness in the inner region of the sensor ring, which is arranged radially inwardly relative to the sensing region in relation to the axis of rotation.

The sensor ring, in the sensing region, thus forms in particular a larger detectable area and/or forms a more strongly pronounced structure, which is detectable in a particularly favourable manner.

Provision is made particularly advantageously that the sensing region extends coaxially with the sensor ring axis and by way of example thus stands out from the sensor ring plane in a manner running transversely thereto.

In a further particularly preferred embodiment, provision is made that the sensor ring is double-layered in the sensing region and thus forms, in a particularly favourable manner, a well pronounced structure which therefore is detectable particularly favourably.

In particular, provision is made that the sensor ring is folded over in the sensing region, such that a pronounced, easily detectable structure is formed in a structurally simple way.

In a particularly expedient embodiment, provision is made that the sensor ring, in the sensing region, has a structure that varies periodically along the peripheral direction around the axis of rotation.

By way of example, a structure is formed in the sensing region rotationally symmetrically to a rotation about the sensor ring axis in respect of an angle of rotation of at most 20°, in particular of most 10°, particularly favourably of at most 5°, particularly advantageously of at most 3°.

Here, the periodically varying structure can be formed in a wide range of different ways.

By way of example, it is conceivable that the periodically varying structure is formed by a different material composition of the sensor ring in the sensing region, wherein the material composition accordingly varies periodically along the peripheral direction around the axis of rotation.

It is also conceivable that the material density in the sensing region varies periodically along the peripheral direction around the axis of rotation, thus forming a periodically varying structure.

Provision is made particularly advantageously that a material property of a material forming the sensor ring in the sensing region, for example an optical and/or in electronic and/or a magnetic property and/or a surface property, varies periodically in the sensing region along the peripheral direction around the axis of rotation, in particular varies periodically and abruptly, and therefore the periodically varying structure is formed by the periodically varying material property.

In a particularly preferred embodiment, provision is made that the periodically varying structure in the sensing region is configured so as to influence a magnetic field to differing degrees in a periodically varying manner along the peripheral direction around the axis of rotation, such that conventional disturbances in the case of the wheel unit for a bicycle, for example caused by impurities such as dirt, impair the detectability of the sensor ring in the sensing region in a barely noticeable manner.

In a further particularly advantageous embodiment, the sensor ring, in the sensing region, has a structure that is periodically toothed along the peripheral direction around the axis of rotation, whereby a periodically varying structure is formed in a particularly favourable and structurally simple manner.

In a particularly advantageous embodiment, provision is made that the structure in the sensing region influencing a magnetic field to differing degrees in a periodically varying manner is formed as a periodically toothed structure, whereby the structure influencing a magnetic field to differing degrees in a periodically varying manner is formed in a structurally simple way.

The periodically varying structure in the sensing region is thus detectable particularly favourably, and therefore the rotational speed of the sensing region about the axis of rotation is also detectable.

In a particularly favourable embodiment, the periodically toothed structure in the sensing region is formed by apertures and teeth arranged periodically in alternation along the peripheral direction around the axis of rotation and/or alternately arranged apertures and material bridges, and the periodically toothed structure is thus formed in a simple way.

The teeth are formed as material bridges, for examples.

In particular, the teeth and apertures are arranged in the sensing region peripherally periodically along the peripheral direction around the axis of rotation.

In particular, the teeth and apertures in the case of the wheel unit are arranged between the spokes and the brake disc.

Here, different embodiments of the toothed structure, in particular the teeth and apertures, are conceivable.

In a particularly favourable embodiment, the teeth extend in an elongate manner in the direction that is radial relative to the axis of rotation.

Provision is made particularly advantageously that the teeth extend in an elongate manner in the sensor ring plane.

Provision is made in a further particularly advantageous embodiment that the teeth extend in an elongate manner in the direction that is axial relative to the axis of rotation.

Provision is made particularly favourably that the teeth extend in an elongate manner transversely to the sensor ring plane.

In a particularly preferred embodiment, provision is made that retaining bars of the sensor ring hold the sensing region of the sensor ring on a mounting ring of the sensor ring.

The sensor ring thus has a degree of stability, and the retaining bars offer a certain level of flexibility in order to absorb vibrations and/or compensate for stresses in the sensor ring.

By way of example, there are just as many retaining bars provided on the sensor ring as there are supporting bars provided on the brake disc.

However, it is also conceivable that a different even number of retaining bars or a different odd number of retaining bars is provided.

Provision is made particularly advantageously that the retaining bars of the sensor ring and the supporting bars of the brake disc cover one another in the direction that is axial relative to the axis of rotation, thus providing the arrangement of the elements with additional stability.

In a particularly favourable embodiment, provision is made that the wheel unit comprises a sensor for detecting the sensing region.

Here, any sensor which senses a periodically varying structure, for example the toothed structure, in particular material bridges and apertures arranged in a periodically alternating manner, can be provided in principle.

Here, it is conceivable that the sensor is an optical sensor which detects optical properties, in particular of the sensor ring in the sensing region.

In a particularly favourable embodiment, provision is made that the sensor is a magnetic sensor which detects magnetic-field-influencing structures, in particular the magnetic-field-influencing structure of the sensing region.

Provision is made advantageously that the sensor is formed as a Hall sensor.

In particular, provision is made advantageously that the sensor detects the periodically varying structure, in particular the toothed structure in the sensing region.

In a particularly favourable embodiment, the sensor detects the sensing region in the direction that is radial relative to the axis of rotation.

In a further, particularly advantageous embodiment, provision is made that the sensor detects the sensing region in the direction that is axial relative to the axis of rotation.

By way of example, the sensor is arranged between the brake disc and the spokes, and in particular the sensor is arranged between the brake disc plane and the spoke surface.

Provision is made in a particularly favourable embodiment that the sensor is arranged offset in relation to the sensing region in the direction that is radial relative to the axis of rotation.

By way of example, the sensor is arranged substantially in the plane in which the sensor ring plane runs.

In a further particularly favourable embodiment, provision is made that the sensor is arranged offset in relation to the sensing region in the direction that is axial relative to the axis of rotation.

Provision is also made advantageously that the wheel unit comprises a brake caliper, wherein the brake caliper and the brake disc are configured to cooperate in a braking manner, in particular the brake caliper cooperates with the brake ring of the brake disc in a braking manner during a braking operation.

The sensor is advantageously arranged on the brake caliper so that the sensor is alignable in a structurally simple manner with the sensing region of the sensor ring, and the available installation space is utilised effectively.

Furthermore, provision is made expediently that the wheel unit comprises a wheel suspension on which the hub is arranged rotatably about the axis of rotation.

Provision is made particularly advantageously that the sensor is arranged on the wheel suspension.

Alternatively or additionally, the invention relates to a bicycle of the type described in the introduction, wherein at least one of the wheel units of the bicycle comprises one or more of the above-mentioned features.

In a particularly favourable embodiment of the bicycle, provision is made that the front wheel unit comprises one or more of the above-mentioned features and the rear wheel unit comprises one or more of the above features.

Provision is made in particular that the bicycle comprises a muscle-driven bicycle drive system.

In a particularly advantageous embodiment, provision is made that the bicycle comprises an auxiliary drive.

Here, provision is made in particular that the auxiliary drive comprises an electric drive motor.

In a particularly preferred embodiment, provision is made that the bicycle comprises an anti-lock braking system, which comprises a control unit and a pressure regulation unit, wherein the control unit actuates the pressure regulation unit depending on the rotational speeds of the wheels of the front and rear wheel unit, and the pressure regulation unit reduces the pressure in a hydraulics system of a braking device which comprises the brake caliper and the brake disc.

By way of example, the pressure regulation unit reduces the pressure in the hydraulics system when the rotational speed of the wheel of the front wheel unit is significantly slower compared to the rotational speed of the wheel of the rear wheel unit during a braking operation.

Here, the sensor of the front wheel unit and the sensor of the rear wheel unit in particular transmit the measured rotational speeds to the anti-lock braking system.

Further features and advantages of the invention are the subject of the following description and of the schematic presentation of some exemplary embodiments.

DETAILED DESCRIPTION OF THE INVENTION

Figure 1:
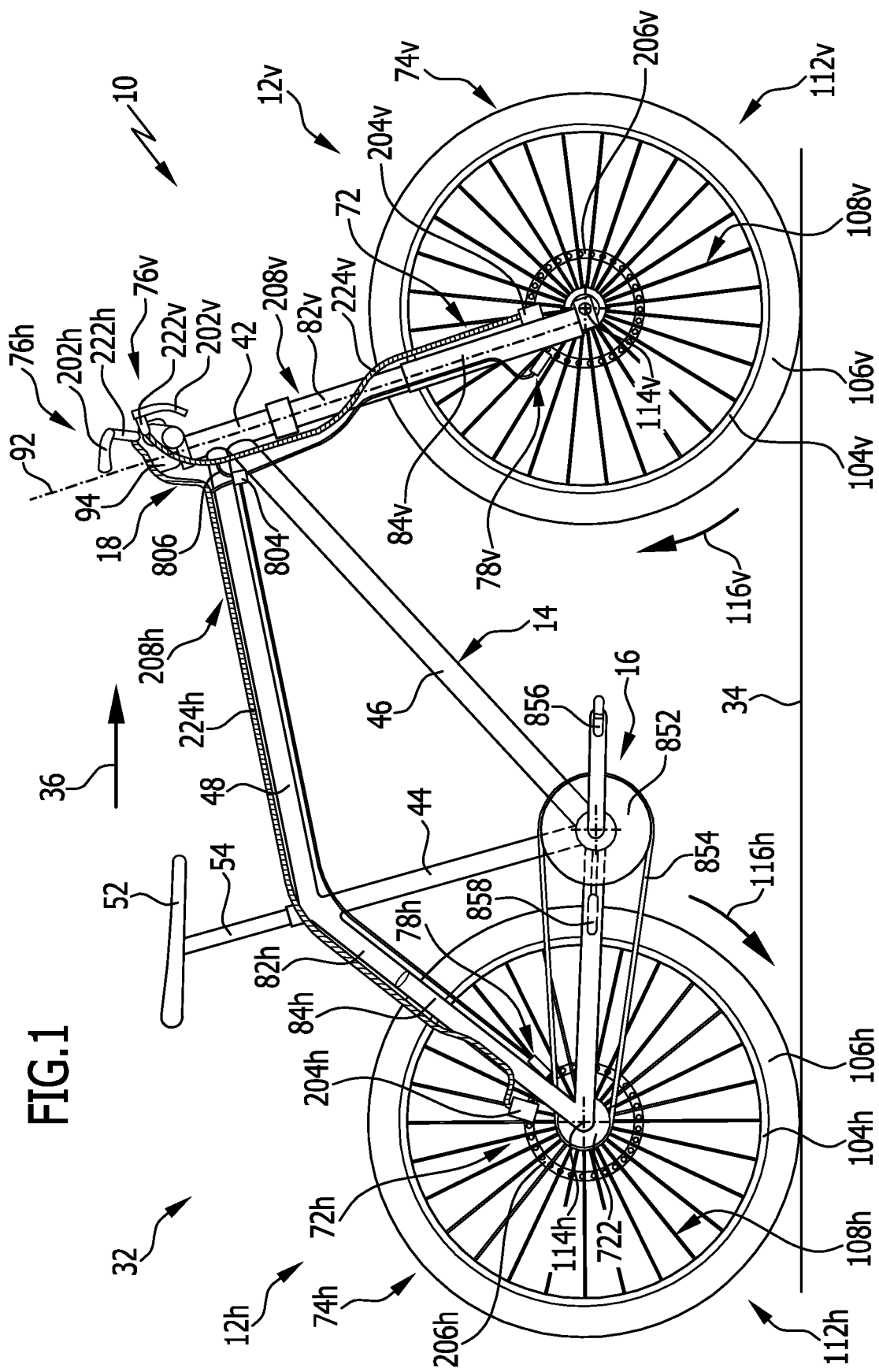
FIG. 1 shows a side view of a first exemplary embodiment of a bicycle according to the invention.

A first exemplary embodiment of a bicycle according to the invention illustrated by way of example in FIG. 1 and denoted as a whole by 10 comprises a front wheel unit 12v and a rear wheel unit 12h, which are connected to one another by a frame 14, and also comprises a muscle-driven bicycle drive system, which is denoted as a whole by 16 and which is driven by the muscle power of a rider, and lastly comprises an anti-lock braking system 18.

Here, the bicycle 10 extends substantially in a main plane 32, which in FIG. 1 corresponds substantially to the drawing plane, and, in the case of the bicycle 10 standing in FIG. 1 on a horizontal standing surface 34 in a state ready to travel, runs substantially transversely, in particular perpendicularly to the standing surface 34, and, in relation to a bicycle orientation 36, which corresponds to the direction of travel when the bicycle 10 travels in a straight line, the front wheel unit 12v is arranged in a front region of the bicycle 10 and the rear wheel unit 12h is arranged in a rear region of the bicycle 10.

The frame 14 comprises a head tube 42, on which the front wheel unit 12v is arranged rotatably, and a rear strut 44, on which the rear wheel unit 12h is arranged, wherein the head tube 42 and the rear strut 44 are connected to one another by a first tube 46 and for example a further, second tube 48.

A saddle 52 with a saddle tube 54 is arranged on the frame 14.

Figure 2:
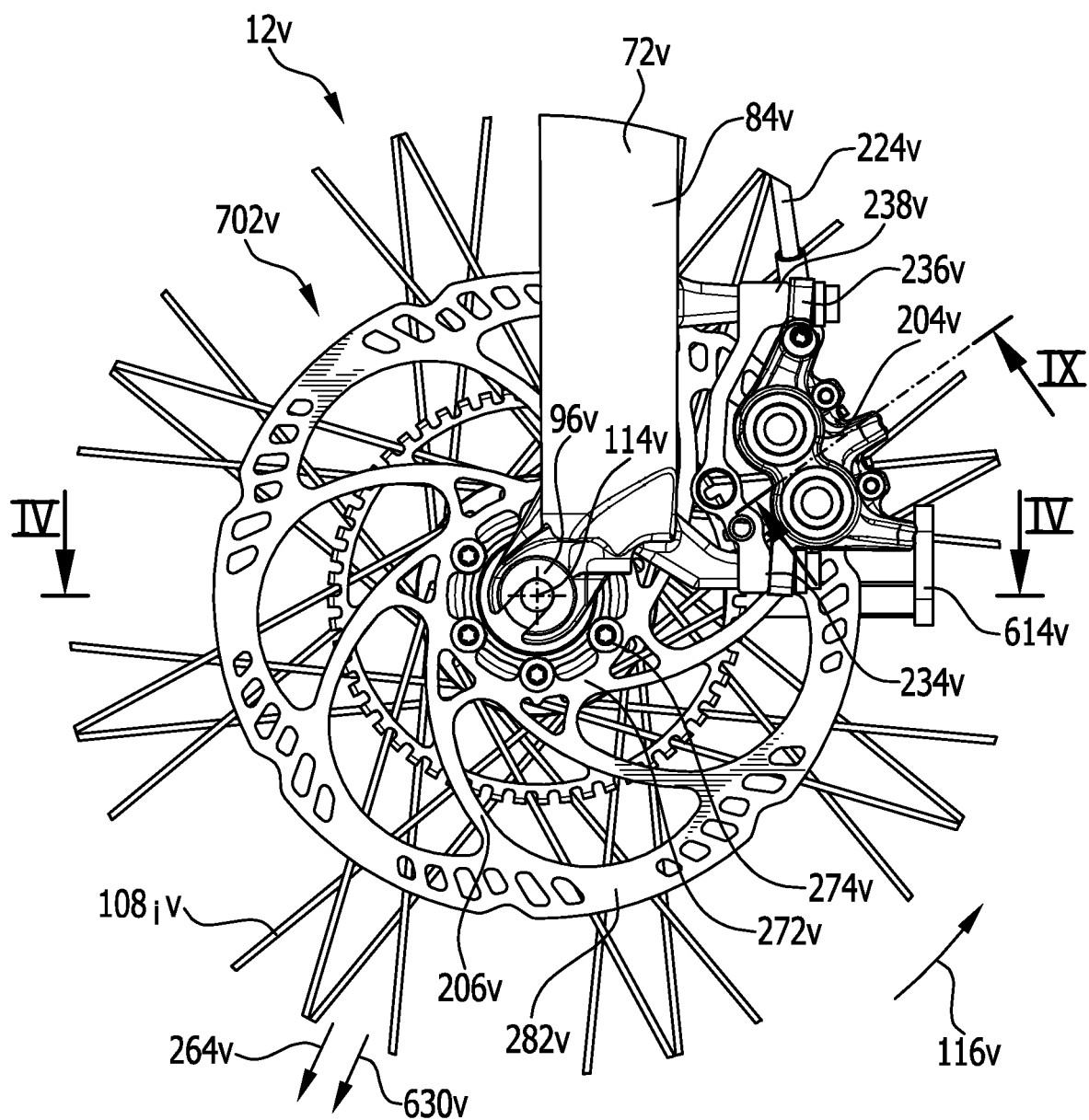
FIG. 2 shows a side view of a detail of a first exemplary embodiment of a front wheel unit according to the invention.
Figure 3:
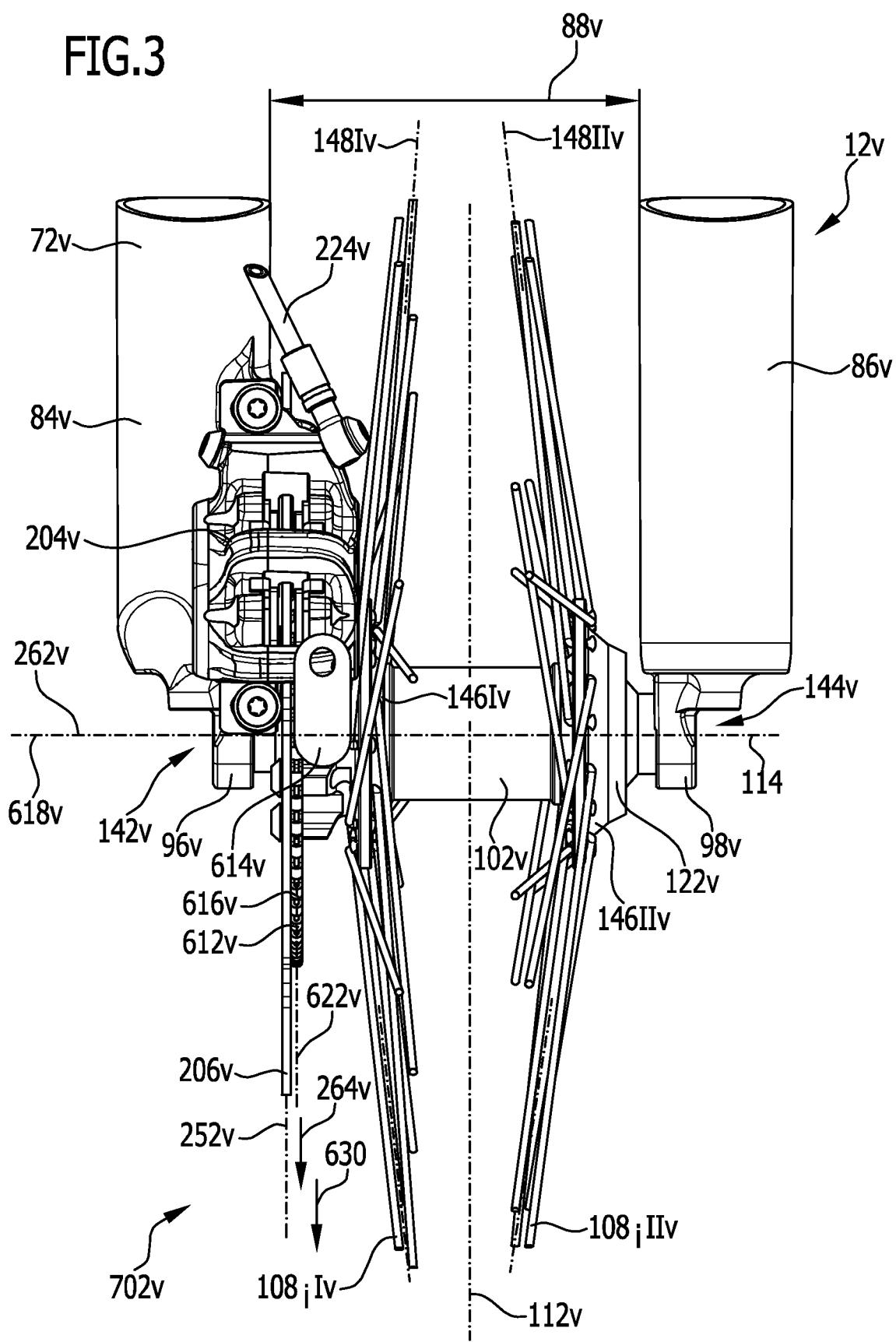
FIG. 3 shows a radial view of a detail of the first exemplary embodiment of a front wheel unit according to the invention.
Figure 4:
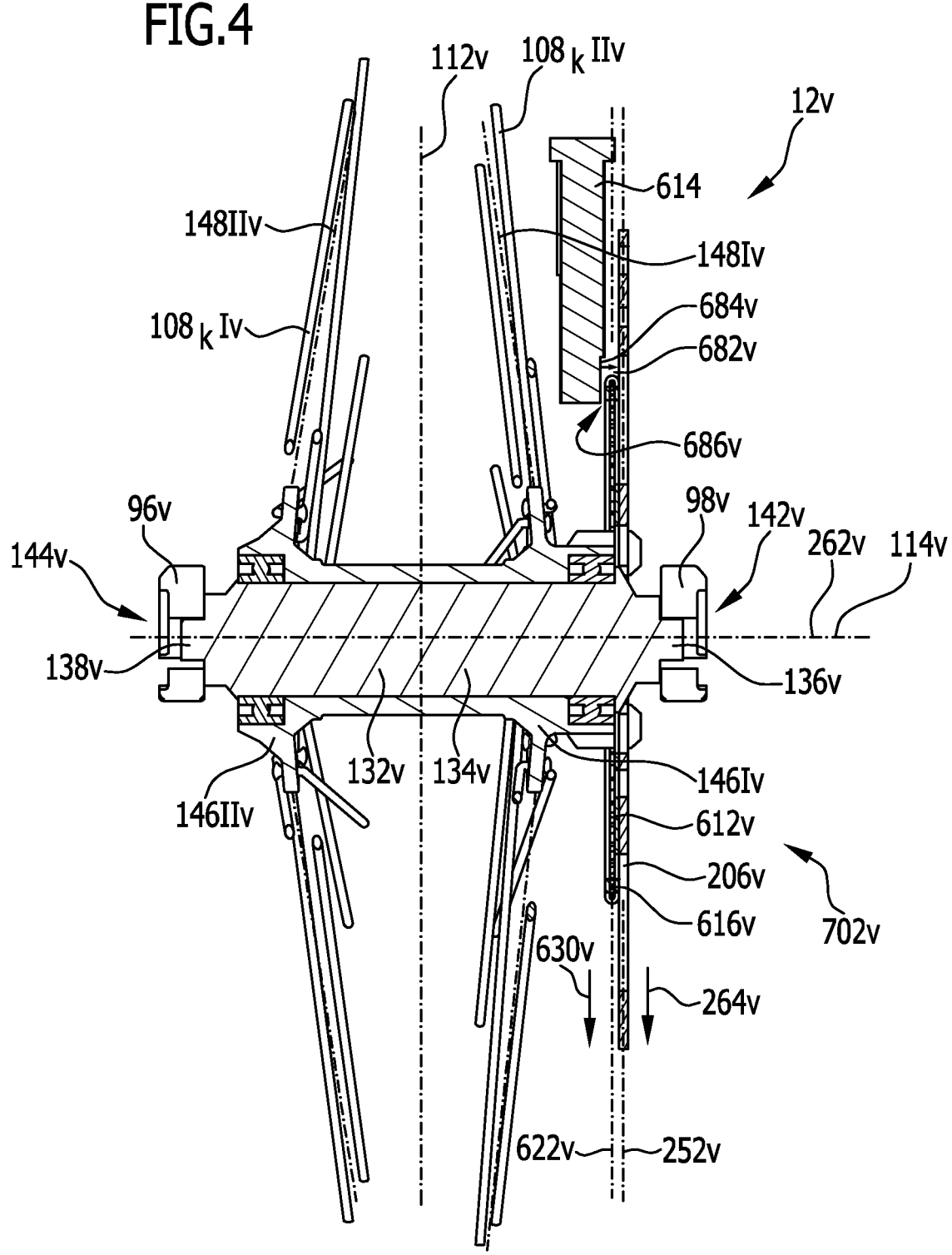
FIG. 4 shows a section IV-IV according to FIG. 2.
Figure 5:
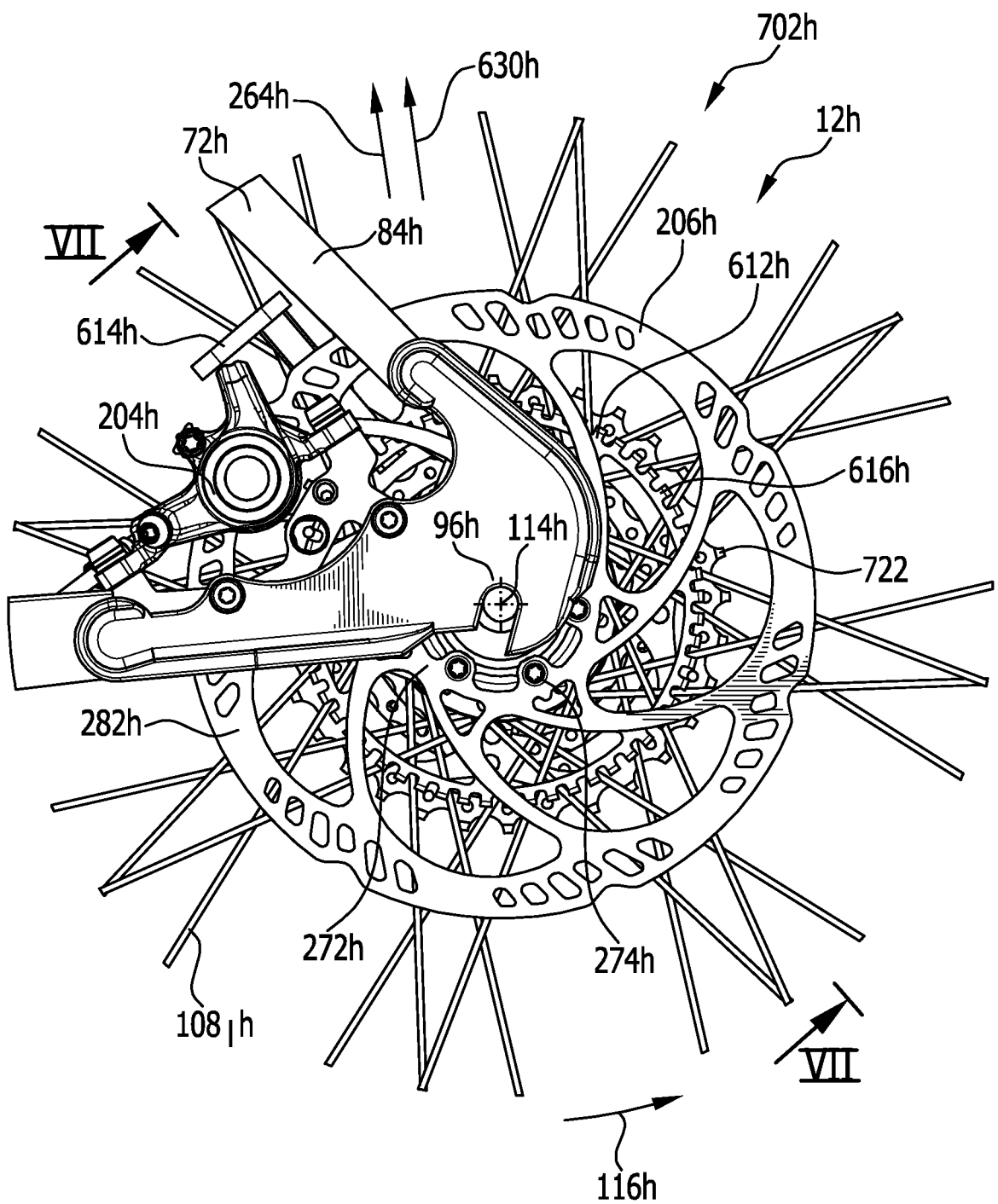
FIG. 5 shows a side view of a detail of a first exemplary embodiment of a rear wheel unit according to the invention.
Figure 6:
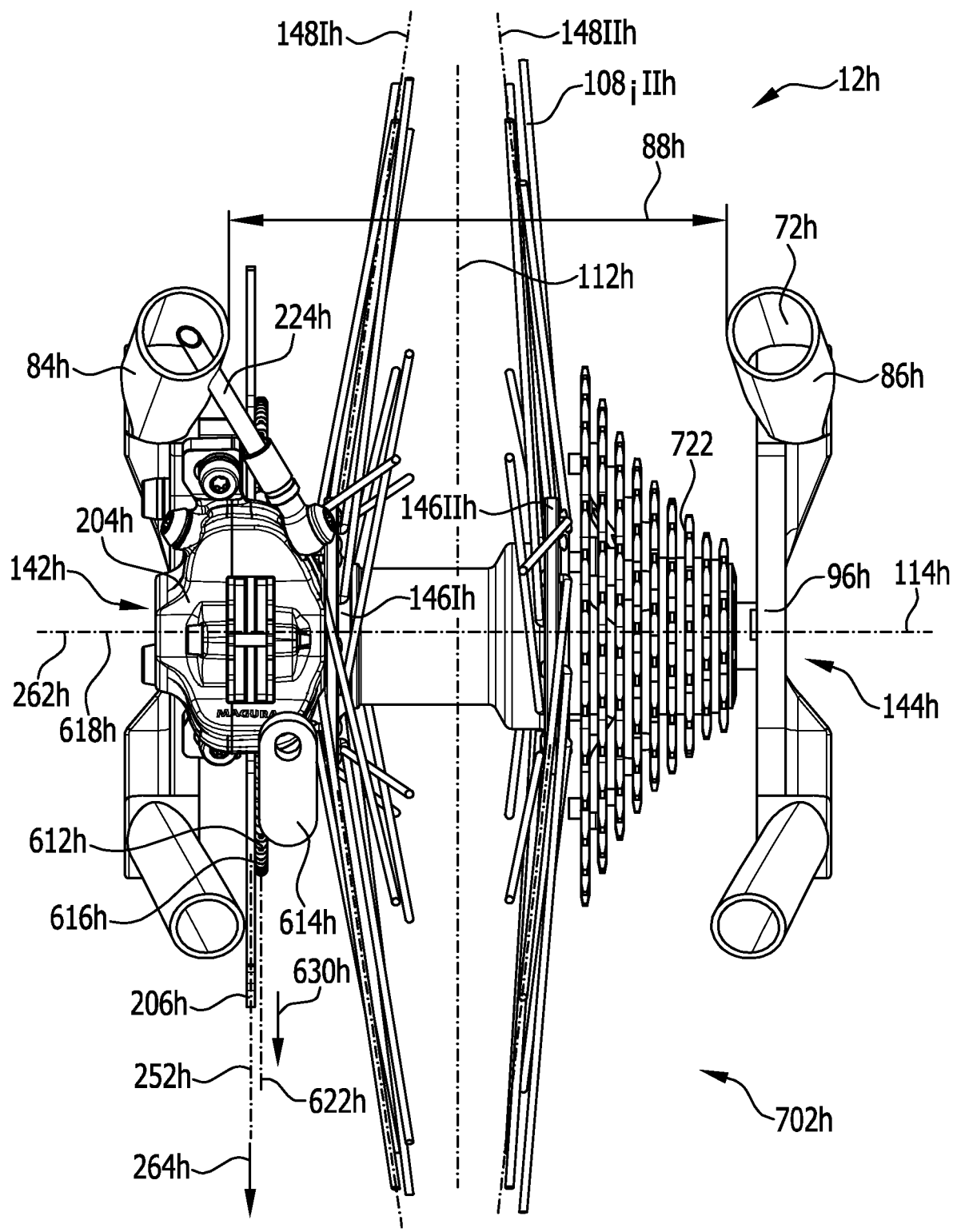
FIG. 6 shows a radial view of a detail of a first exemplary embodiment of a rear wheel unit according to the invention.
Figure 7:
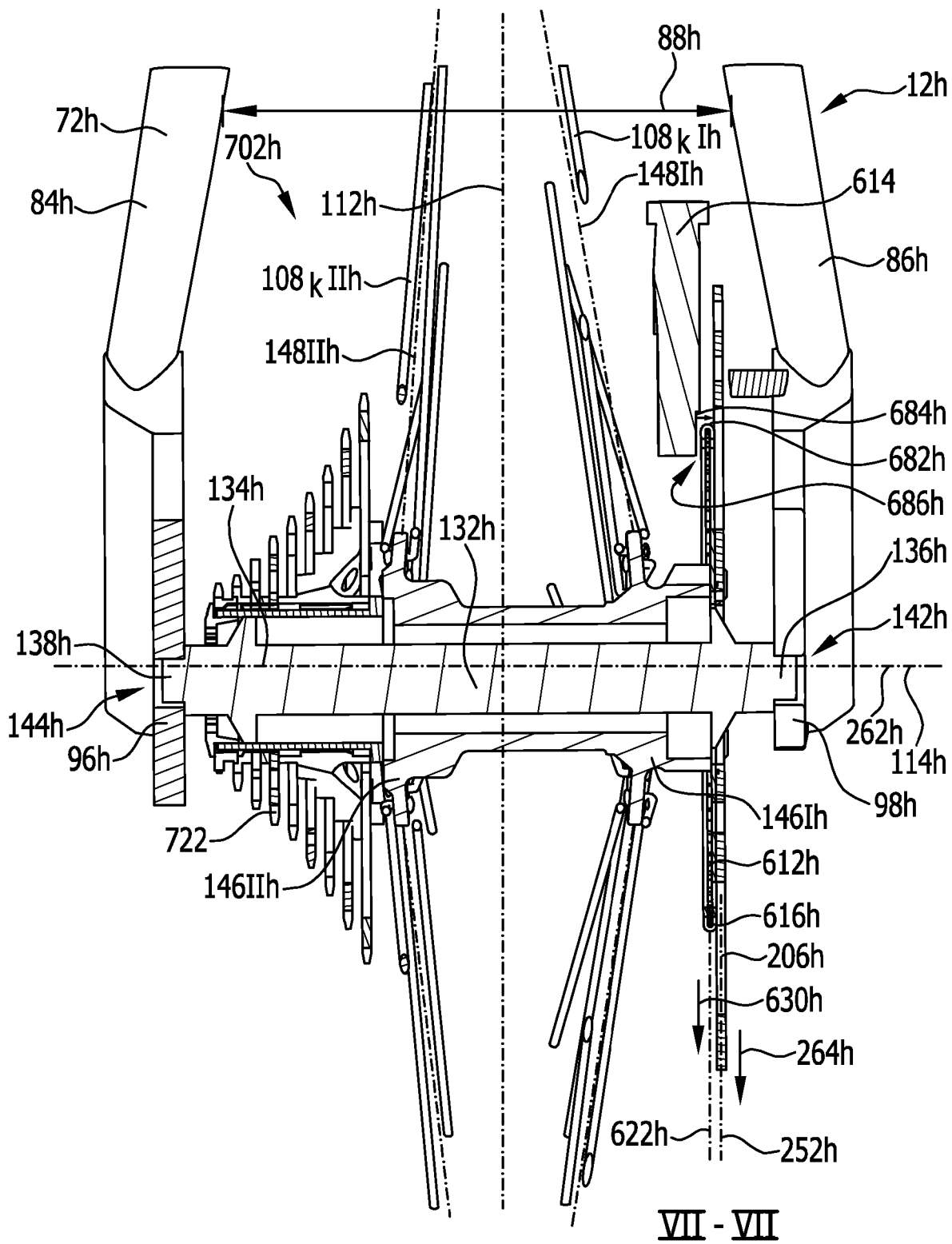
FIG. 7 shows a section VII-VII according to FIG. 5.

The front wheel unit 12v, which is illustrated in FIGS. 2 to 4, and the rear wheel unit 12h, which is illustrated in FIGS. 5 to 7, are constructed similarly and will be described jointly hereinafter insofar as they are constructed similarly, wherein the specification v and h will be omitted where it is not necessary.

The wheel unit 12 comprises a wheel suspension 72, a wheel 74, which is arranged rotatably on the wheel suspension 72, a braking device 76, which is configured to act in a braking manner on the wheel 74, such that the rotational speed of the wheel 74 under the influence of the braking effect of the braking device 76 becomes slower, and also a sensor unit 78, with which the rotational speed of the wheel 74 is determinable.

The wheel suspension 72 comprises a shaft 82, a first fork leg 84, and a second fork leg 86, wherein the fork legs 84 and 86 are arranged on the shaft 82.

The first fork leg 84 and the second fork leg 86 run substantially parallel to one another and are spaced from one another by a spacing 88, such that the wheel 74 is positionable between the first fork leg 84 and the second fork leg 86.

The shaft 82v of the front wheel unit 12v is arranged here on the head tube 42 in particular so as to be rotatable about a steering axis 92, such that the front wheel unit 12v is steerable by means of a handlebar 94.

The shaft 82h of the rear wheel unit 12h is arranged by way of example on the frame 14, in particular on the rear strut 44.

In the case of the wheel suspension 72, a first dropout 96, which for example is arranged on the first fork leg 84, and a second dropout 94, which for example is arranged on the second fork leg 96, are provided in order to fasten the wheel 74.

The wheel 74 comprises a hub 102, a wheel rim 104 on which an air-filled tyre 106 is fitted, and a plurality of spokes 108, only some of which spokes $108_i$, . . . have been identified by way of example in the Figures, wherein the spokes 108 connect the wheel rim 104 to the hub 102.

Here, the wheel rim 104 runs substantially along a circle which lies in a wheel plane 112 and through the centre point of which a geometric axis of rotation 114 runs, wherein the axis of rotation 114 runs perpendicularly to the wheel plane 112, and the wheel plane 112 in the case of the bicycle 10 illustrated in FIG. 1 coincides with the main plane 32, however the front wheel plane 112v can also run transversely to the main plane 32, since the front wheel 14v is fastened to the rotatable front wheel suspension 72v.

Here, the wheel rim 104, in particular the wheel 74, is arranged rotatably about the axis of rotation 116 in a peripheral direction 116.

Here, the direction of rotation 116 runs substantially in the wheel plane 112 and is always perpendicular to a radial direction of the axis of rotation 114 along a revolution about the axis of rotation 114.

The hub 104 is oriented substantially perpendicularly to the wheel plane 112 and along the axis of rotation 114, as is illustrated in FIGS. 2 to 7, and therefore the hub 102 is arranged in the wheel plane 112 in a manner centred relative to the wheel rim 104, as is illustrated in FIG. 1.

Figure 8:
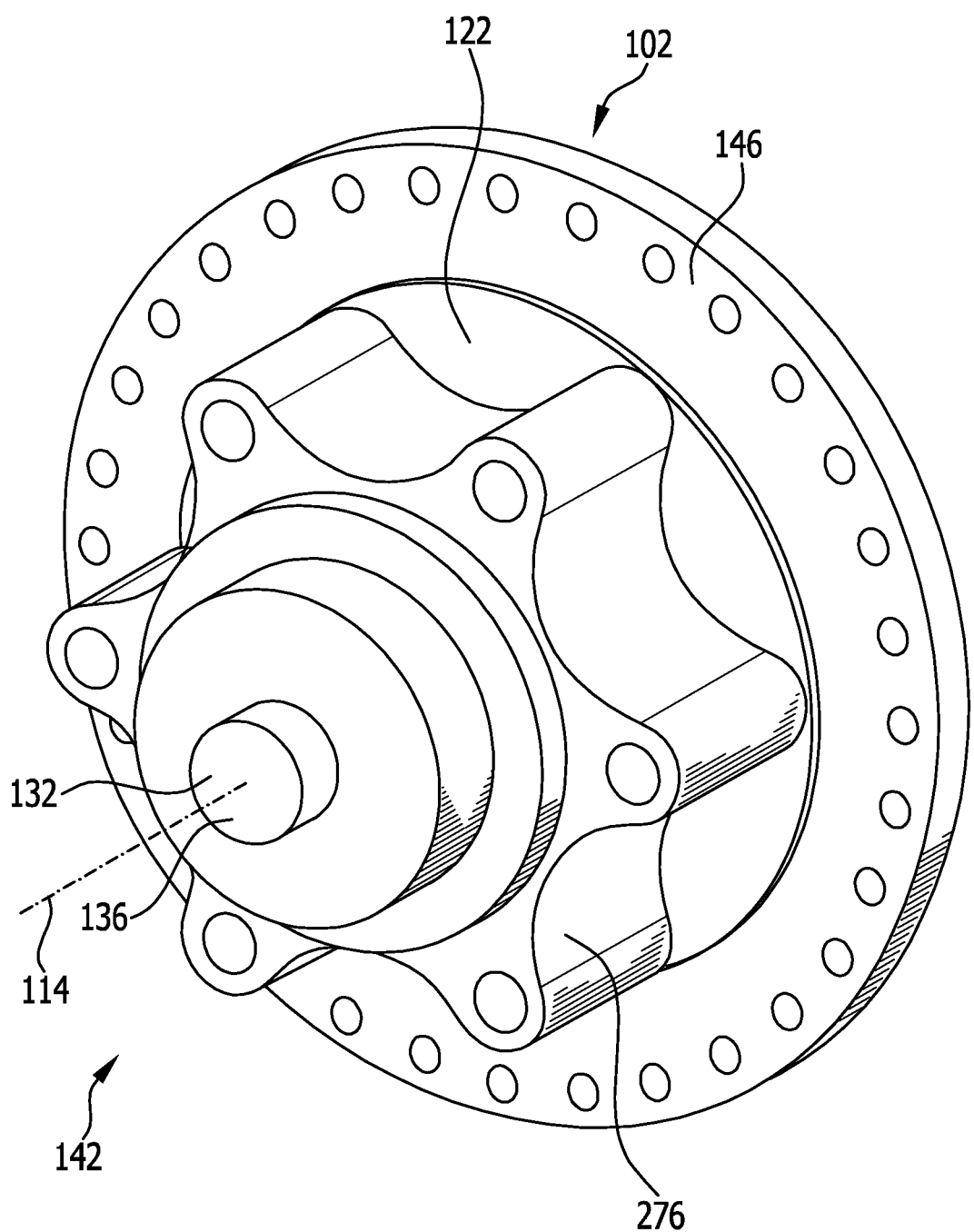
FIG. 8 shows a perspective illustration of an exemplary embodiment of a hub according to the invention.
Figure 9:
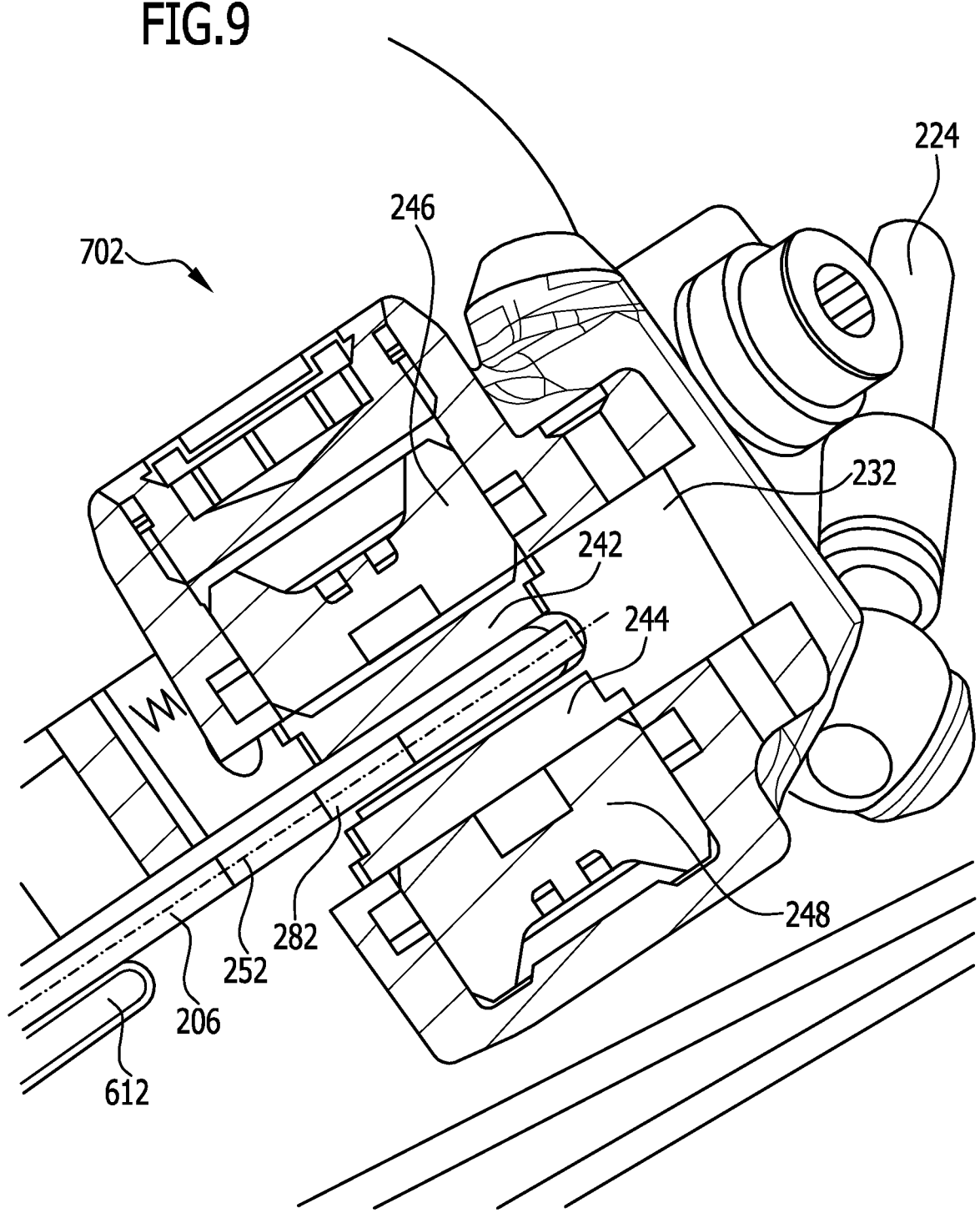
FIG. 9 shows a section IX-IX according to FIG. 2 in a region of an exemplary embodiment of a brake caliper according to the invention.

The hub 102, which is also illustrated without further component parts in FIG. 8, comprises a hub housing 122 and a wheel axle 132, which is oriented along the axis of rotation 114, wherein the wheel axle 132 is mounted rotatably about the axis of rotation 114 in the hub housing 122. Here, a middle region 134 of the wheel axle 132, which middle region lies between a first end region 136 and a second end region 138 of the wheel axle 132, is rotatably mounted in the hub housing 122, and the first end region 136 and the second end region 138 of the wheel axle 132 protrude out from opposite front sides 142 and 144 of the hub housing 122.

The wheel 74 is fastened to the wheel suspension 72 by means of the wheel axle 132, wherein in particular the first end region 136 of the wheel axle 132 is arranged at the first dropout 96, and the second end region 138 of the wheel axle 132 is arranged at the second dropout 98.

The hub housing 122 comprises a first annular collar 146I and a second annular collar 146II, which are arranged offset relative to one another along the axis of rotation 114 and are disposed on different sides of the wheel plane 112 at equal distances from the wheel plane 112, such that the first annular collar 146I is positioned between the wheel plane 112 and the front side 142, and the second annular collar 146II is positioned between the wheel plane 112 and the second front side 144. The annular collars 146I and 146II are provided in order to fasten the spokes 108.

Of the spokes 108, some of the spokes 108I are arranged on the first annular collar 146I and the rest of the spokes 108II are arranged on the second annular collar 146II, wherein the number of spokes 108I and the number of spokes 108II corresponds in each case to half the total number of spokes 108.

In the Figures, only some of the spokes $108_iI$, . . . of the spokes 108I and only some of the spokes $108_iII$, . . . of the spokes 108II have been identified by way of example.

Insofar as the configuration and arrangement of the spokes 108I and of the first annular collar 146I and also of the spokes 108II and of the second annular collar 146II are similar, these will be described jointly hereinafter, and the specification I and II will be omitted where possible.

The spokes 108 extend from the annular collar 146, to which they are fastened, to the wheel rim 104, to which they are also fastened, such that the wheel rim 104 is rotatable with the hub housing 122 relative to the wheel axis 132 about the axis of rotation 114.

The spokes 108 here run substantially in a spoke surface 148, wherein the spoke surface 148, in a region of the axis of rotation 114, is spaced from the wheel plane 112, in particular by a spacing by which the annular collar 146 is also spaced from the wheel plane 112, such that the spoke surface 148 runs starting from the annular collar 146, and runs towards the wheel plane 112 in the direction that is radial relative to the axis of rotation 114, and meets the wheel plane 112 in the region of the wheel rim 104, and the spoke surface 148 is rotationally symmetrical with respect to the axis of rotation 114 and is conical.

Here, the first spoke surface 148I and the second spoke surface 148II run substantially mirror-symmetrically with respect to the wheel plane 112, such that the apex-like regions of the conical spoke surfaces 148I and 148II are thus spaced along the axis of rotation 114 and the spoke surfaces 148I and 148II converge towards one another starting from the apex-like regions.

The braking device 76 comprises an actuation unit 202, a brake caliper 204, which in particular is arranged on the wheel suspension 72, and a brake disc 206, which is arranged on the hub 102, in particular on the hub housing 122.

Here, the actuation unit 202, for example a lever, and the brake caliper 204 are connected in a pressure-transmitting manner via a hydraulics system 208, such that the brake caliper 204 is actuated by actuation of the actuation unit 202, whereby the brake caliper 204 cooperates in a braking manner with the brake disc 206 and a rotational movement of the brake disc 206 is thus reduced, and, since the brake disc 206 is arranged on the wheel 74, a rotational speed of a rotational movement of the wheel 74 is thus also reduced.

The hydraulics system 208 comprises a master cylinder 222, which is connected to the brake caliper 204 via a pressure line 224.

The brake caliper 204 comprises a brake caliper housing 232, which is mounted, by means of a first support 234 and a second support 236, on the wheel suspension 72, in particular on one of the fork legs 84, 86, for example by means of a brake caliper holder 238.

The brake caliper 204 additionally comprises a first brake pad 242 and a second brake pad 244, which are arranged movably on the brake caliper housing 232, wherein the brake pads 242 and 244 are arranged at a distance from one another, such that the brake disc 206 is positionable between the brake pads 242 and 244.

The first brake pad 242 is acted on by a first piston 246, and the second brake pad 244 is acted on by a second piston 248, wherein the first piston 246 and the second piston 248 are connected to the hydraulics system 208, in particular via the pressure line 224.

Figure 10:
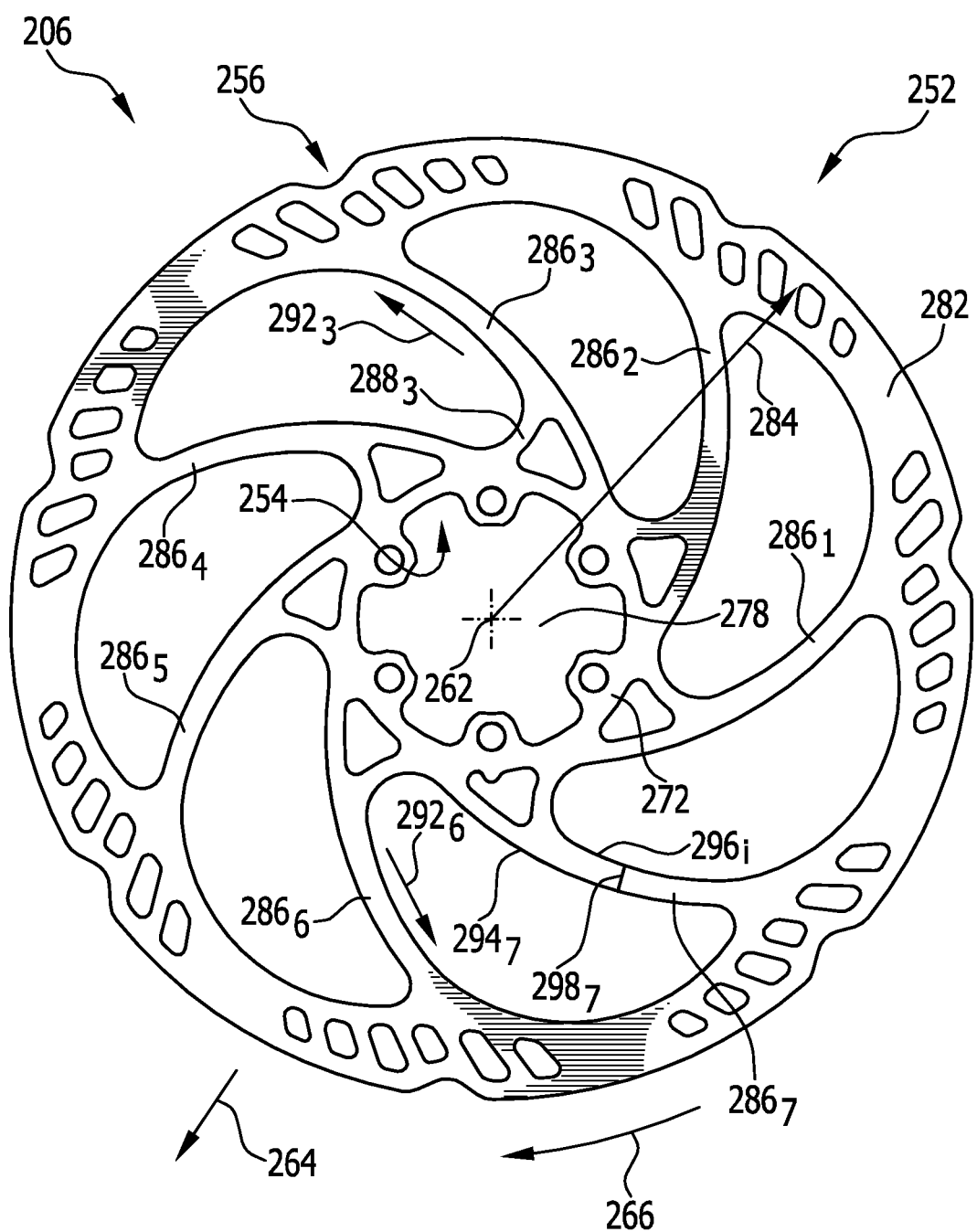
FIG. 10 shows a side view of an exemplary embodiment of a brake disc according to the invention.

The brake disc 206 extends substantially in a brake disc plane 252, which corresponds to the drawing plane in FIG. 10, from an inner region 254 to an outer region 256, wherein the brake disc 206 extends relative to a brake disc axis 262, which runs substantially perpendicularly to the brake disc plane 252, in a direction 264 that is radial relative to the brake disc axis 262 from the inner region 254 to the outer region 256, and the outer region 256 lies radially outside the inner region 254 in relation to the radial direction 264, and the outer region 256 in the brake disc plane 252 encircles the inner region 254 along a peripheral direction 266 around the brake disc axis 262.

A mounting ring 272 is provided in the inner region 254 of the brake disc 206, which mounting ring is mountable by means of a fastening element 274 to the hub 102, in particular to a retaining element 276 of the hub housing 122, which retaining element for example is formed in a manner similar to a flange, such that the brake disc 206 is fixedly connected to the hub housing 122.

For this purpose, the retaining element 276 and the mounting ring 272 in accordance with the exemplary embodiments in FIGS. 8 and 10 each comprise six holes, and the fastening element 274 comprises six connection parts, which are provided one for each hole in the mounting ring 272 and each hole in the retaining element 276, and therefore the mounting ring 272 is connected to the retaining element 276 by means of the connection parts of the fastening element 274.

In a variant, the retaining element 276 comprises a toothed ring and the fastening element 274 comprises a receiving region for the toothed ring, and the mounting ring 272 is mountable on the fastening element 274 and therefore the mounting ring 272 is mountable on the retaining element 276 by means of the fastening element 274.

An axle pass-through opening 278 is arranged in a centred manner in the mounting ring 272, through which opening the wheel axle 132 can pass, wherein the brake disc axis 262 runs through the axle pass-through opening 278.

A brake ring 282, which annularly surrounds the brake disc axis 262 substantially with a radius 284, is arranged in the outer region 256 of the brake disc 206, and the brake pads 242 and 244 act on the brake ring 282 in the event of a braking operation.

The mounting ring 272 and the brake ring 282 are connected to one another by supporting bars 286, wherein for example supporting bars 286 are supported on the mounting ring 272 by means of auxiliary supporting bars 288.

Here, only some supporting bars $286_i$, . . . of the supporting bars 286 have been identified in the Figures, and only some of the auxiliary supporting bars $288_i$, . . . of the auxiliary supporting bars 288 have been identified.

In the embodiment according to FIG. 10, N=7 supporting bars $286_1$ to $286_7$ are provided.

Here, the supporting bars 286 are elongate and extend from the inner region 254 to the outer region 256 of the brake disc 206, for example the supporting bars 286 extend in an arcuate manner.

Each individual supporting bar $286_i$ of the supporting bars 286 extends in an elongate manner from the inner region 254 to the outer region 256 in a direction of extent $292_i$, wherein the direction of extent $292_i$ runs at an incline to the direction 264 that is radial relative to the brake disc axis 262.

Each supporting bar $286_i$ of the supporting bars 286 extends transversely to its direction of extent $292_i$ from a first edge $294_i$ to a second edge $296_i$, wherein a spacing between the edges $294_i$ and $296_i$ constitutes a width $298_i$ of the supporting bar $286_i$, and the width $298_i$, in relation to a direction running transversely to the radial direction 264, is measured in particular substantially in the peripheral direction 266 running peripherally around the brake disc axis 262.

In the Figures, only some edges $294_i$, . . . and $296_i$, . . . of the edges 294 and 296 have been identified.

In the exemplary embodiment, the widths $298_i$ of the supporting bars $286_i$ corresponding to a width 298 are of equal size, wherein, in a variant, provision is made that the widths $298_i$, . . . have different sizes.

In particular, the supporting bars 286 are arranged periodically in the direction of the peripheral direction 266, by way of example the arrangement of the supporting bars 286 is n-rotationally symmetrical with respect to the brake disc axis 262, i.e. the arrangement of the bars 286 is symmetrical with respect to a rotation about the brake disc axis 262 with an angle of 360°/n, wherein n is a natural number and in the exemplary embodiment corresponds to the number N of the supporting bars 286.

The braking device 76 thus functions as follows.

The actuation unit 202 acts, for example by means of the lever, on the master cylinder 222 of the hydraulics system 208, whereby the master cylinder 222 generates an increase in pressure in the hydraulics system 208, which is transferred through the pressure line 224 to the brake caliper 204 by means of a hydraulic fluid, whereby the brake caliper 204 is actuated.

Here, in the brake caliper 204, the increased pressure in the hydraulics system 208 is converted into a mechanical movement of the pistons 246 and 248, whereby the first piston 246 acts on the first brake pad 242 and the second piston 248 acts on the second brake pad 244, and the first brake pad 242 and the second brake pad 244 are thus moved towards one another, such that the brake ring 282 positioned between the first brake pad 242 and the second brake pad 244, which brake ring rotates as the bicycle 10 moves, is acted on from one side by the first brake pad 242 and from the other side by the second brake pad 244, and the rotational speed of the brake ring 282 and consequently also the rotational speed of the wheel 74 connected to the brake ring 282 is reduced on account of the resultant friction.

The sensor unit 78 comprises a sensor ring 612, which is arranged on the wheel 74, and a sensor 614, which is aligned with a sensing region 616 of the sensor ring 612 and detects this sensing region 616, in particular detects a relative movement of the sensing region 616 relative to the sensor 614.

Figure 11:
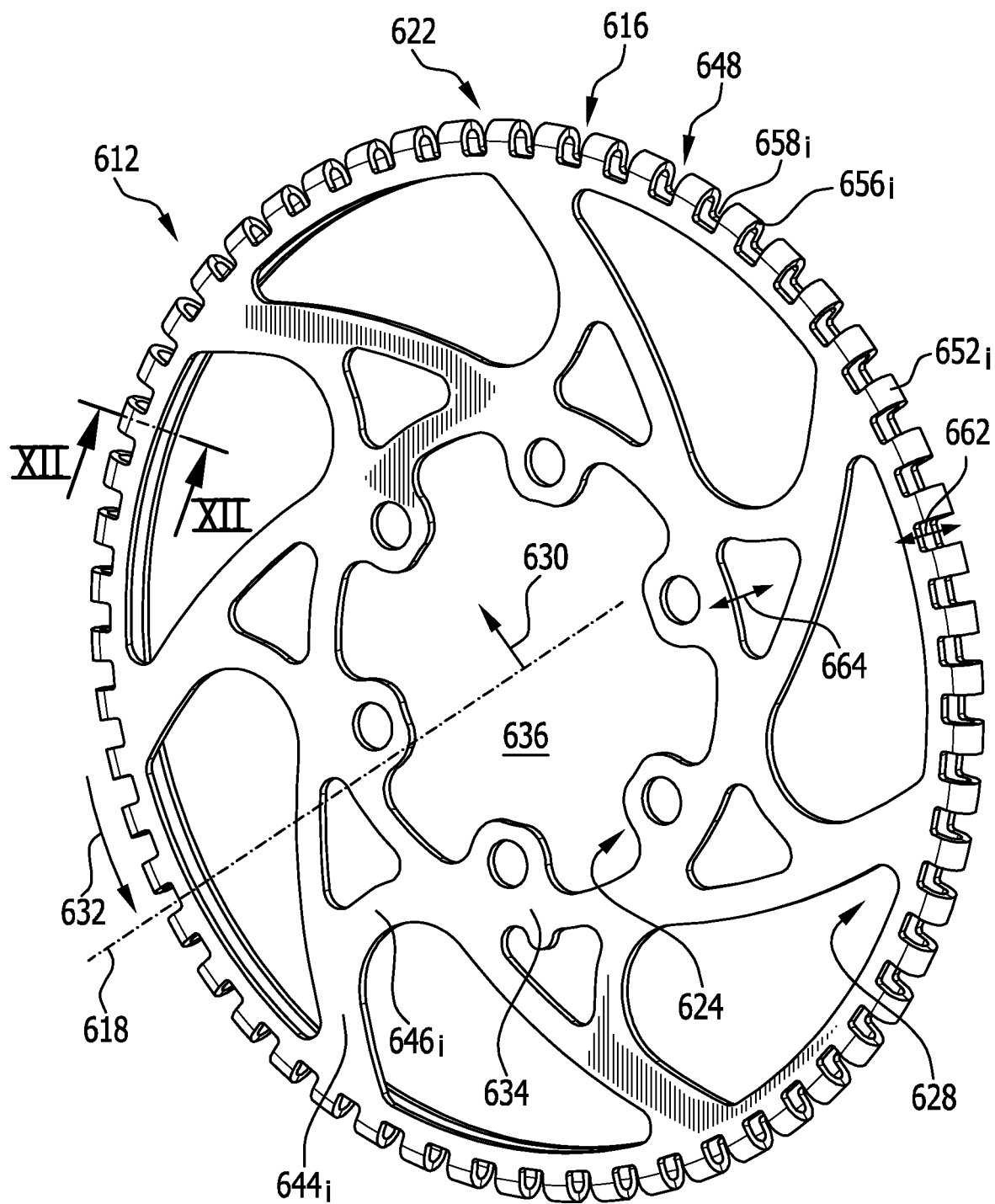
FIG. 11 shows a perspective illustration of a first exemplary embodiment of a sensor ring according to the invention.
Figure 12:
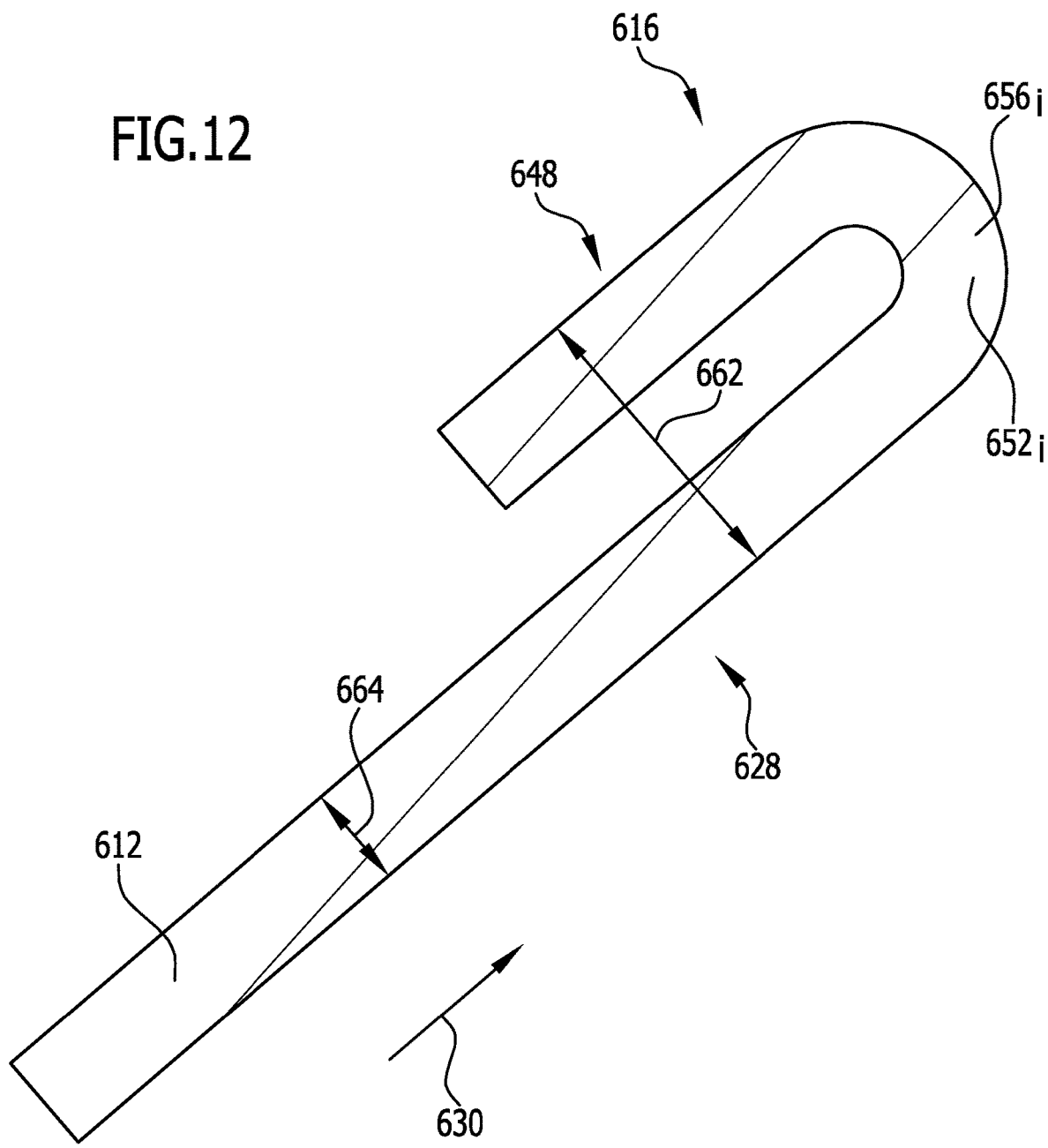
FIG. 12 shows a section XII-XII through a tooth of the sensor ring according to FIG. 11.
Figure 13:
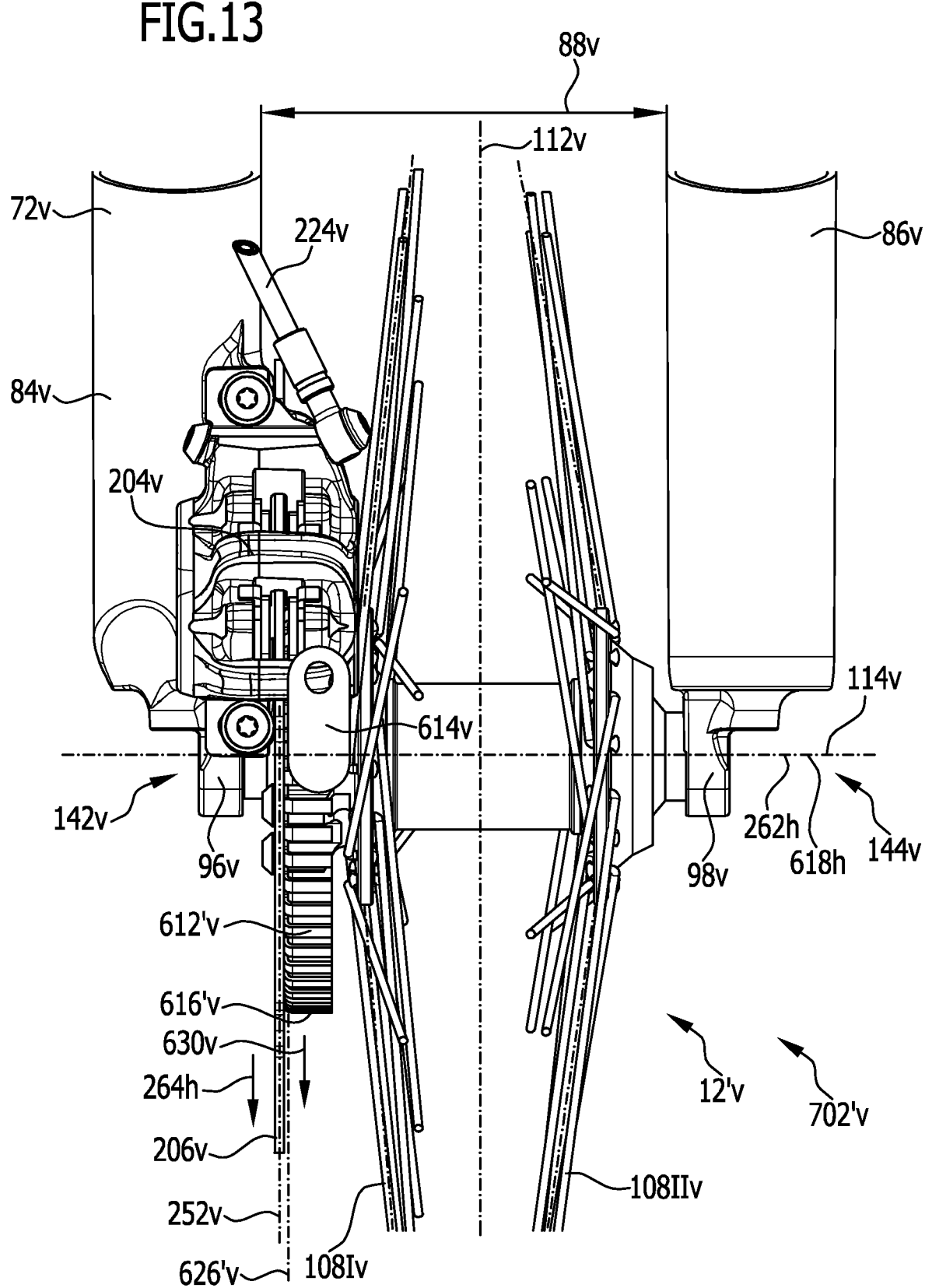
FIG. 13 shows an illustration of a second exemplary embodiment of a front wheel unit according to the invention, similarly to that in FIG. 3.
Figure 14:
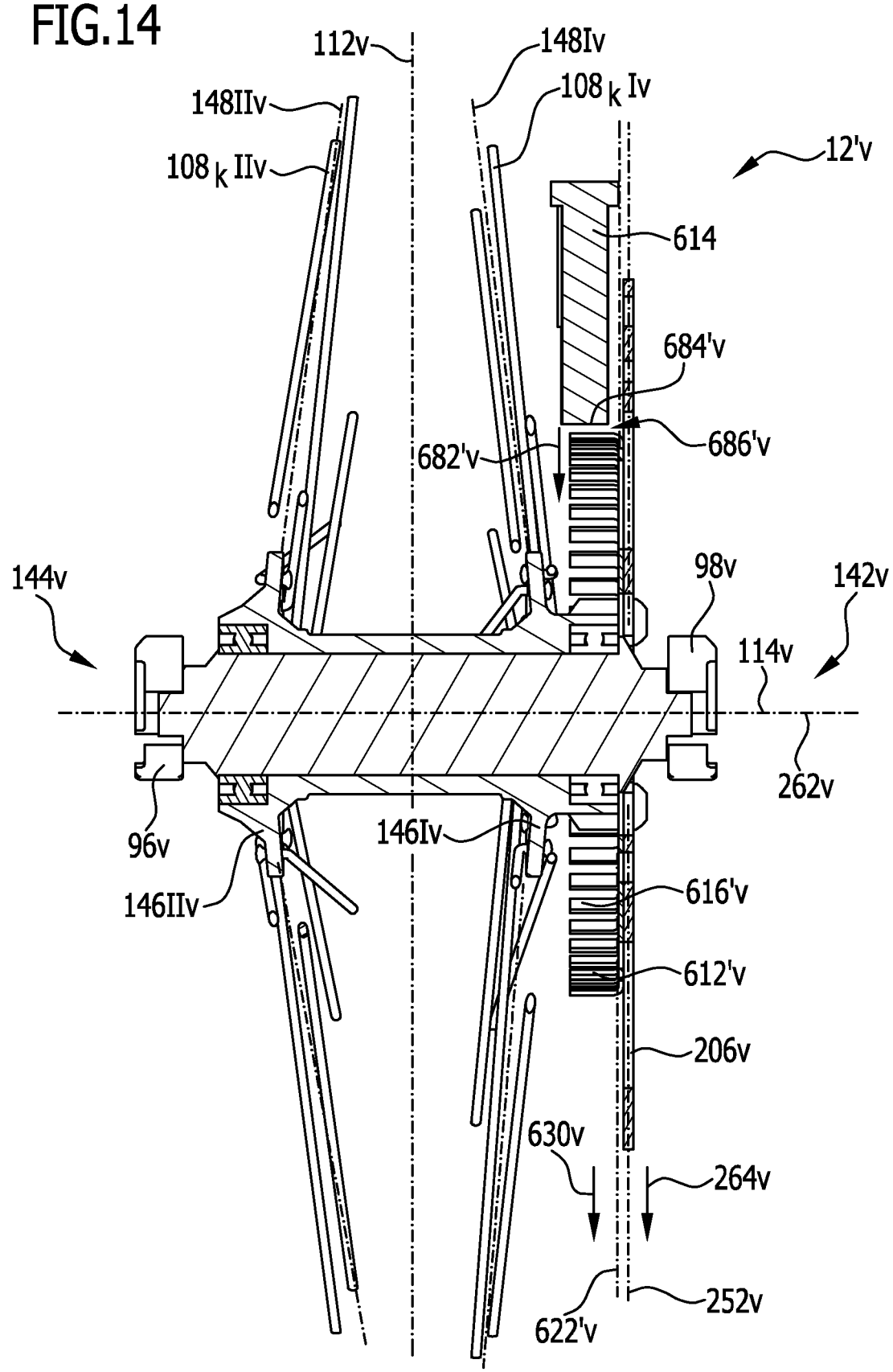
FIG. 14 shows an illustration of the second exemplary embodiment of a front wheel unit according to the invention, similarly to that in FIG. 4.
Figure 15:
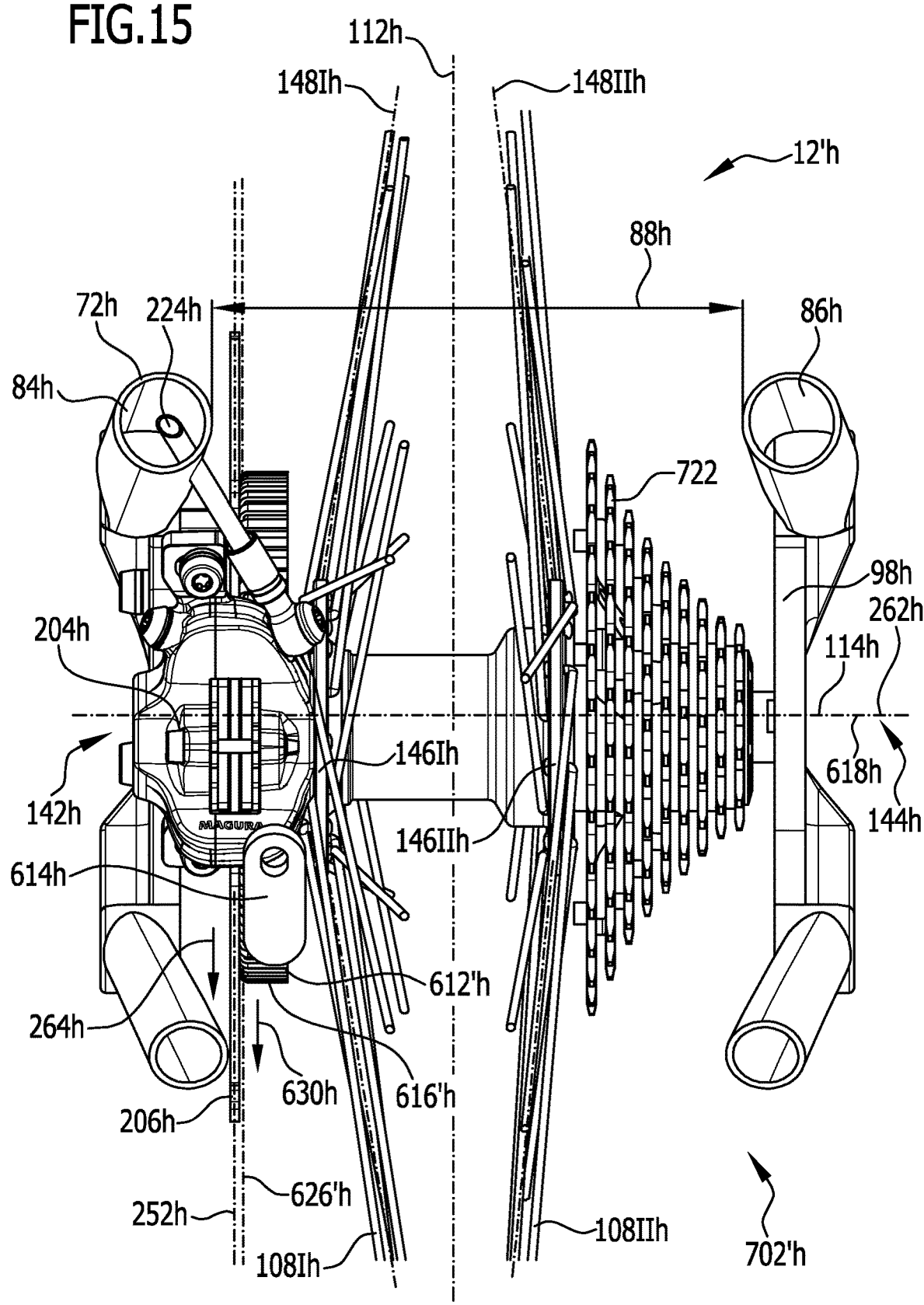
FIG. 15 shows an illustration of a second exemplary embodiment of a rear wheel unit according to the invention similarly to that in FIG. 6.
Figure 16:
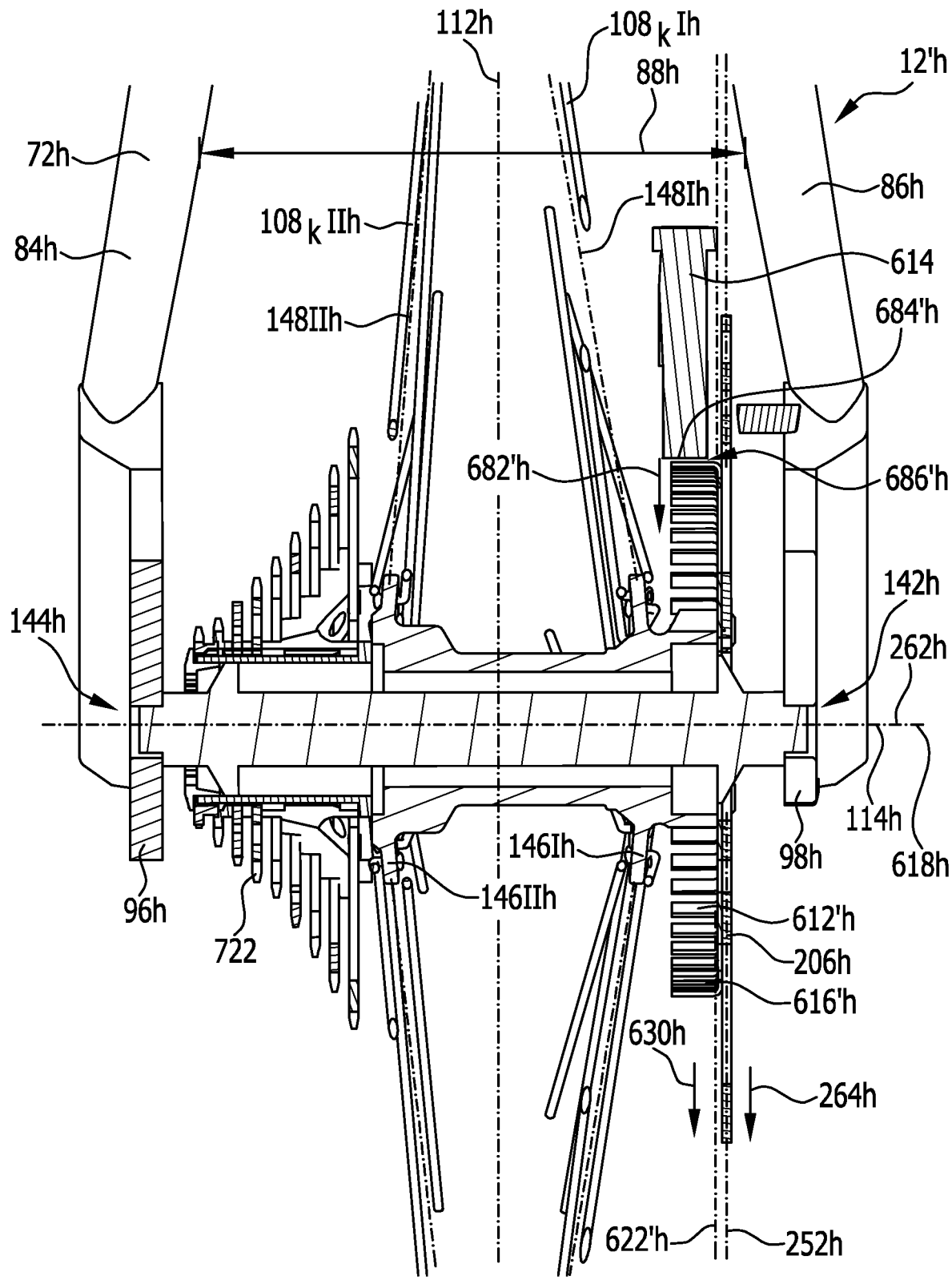
FIG. 16 shows an illustration of the second exemplary embodiment of a rear wheel unit according to the invention similarly to that in FIG. 7.
Figure 17:
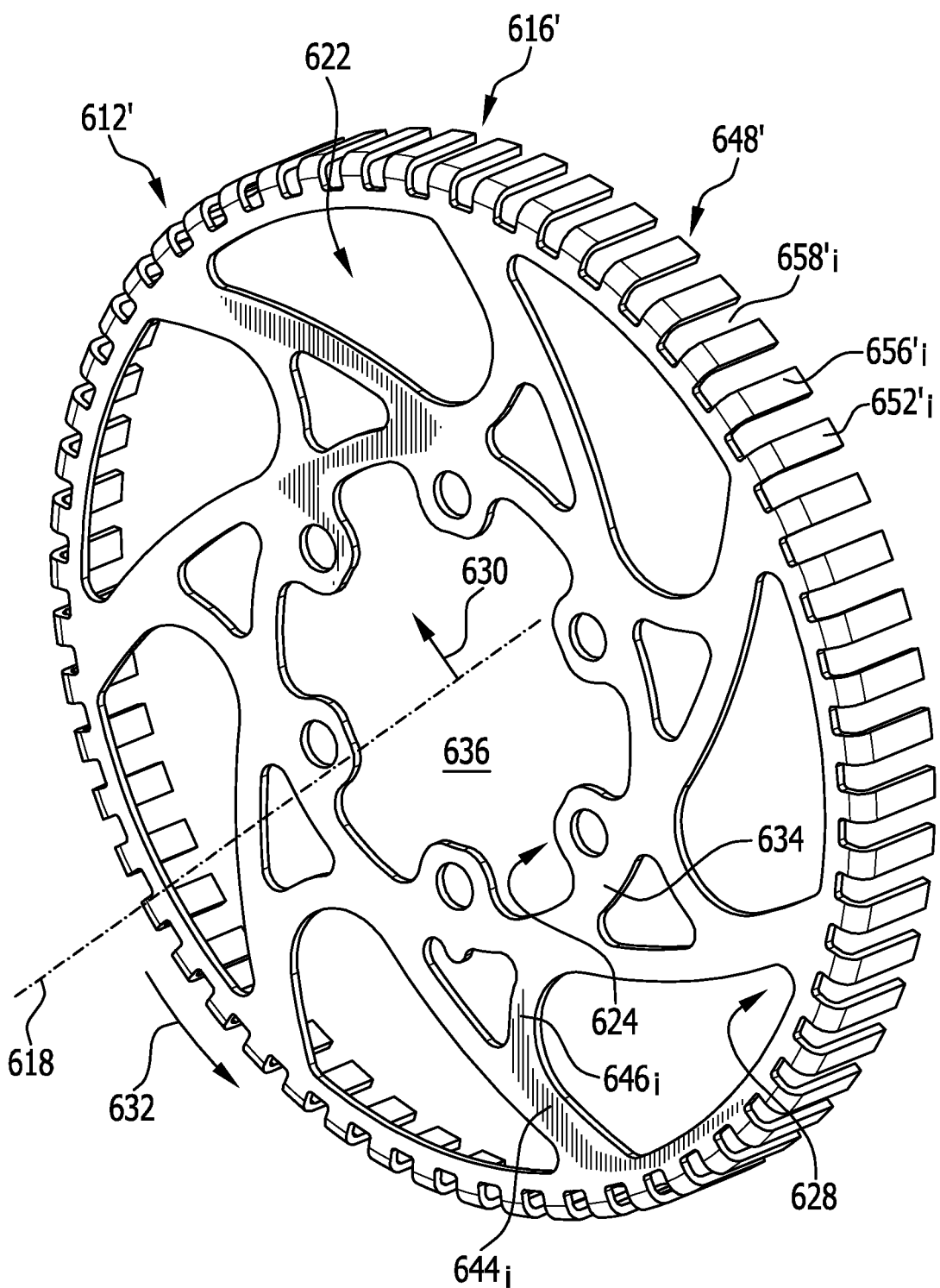
FIG. 17 shows a perspective illustration of a second exemplary embodiment of a sensor ring according to the invention.

The first exemplary embodiment of a sensor ring 612 according to the invention illustrated in FIG. 11 extends substantially in a sensor ring plane 622 running perpendicularly to a sensor ring axis 608, starting from an inner region 624 to an outer region 628, wherein the inner region 624 lies radially inwardly and the outer region 628 lies radially outwardly with respect to a direction 630 that is radial relative to the sensor ring axis 618, such that the outer region 628 encircles the inner region 624 in the sensor ring plane 622 in a peripheral direction 632 running peripherally around the sensor ring axis 618.

A mounting ring 634, which encircles an axis pass-through opening 636 in the sensor ring plane 622, is arranged in the inner region 624 of the sensor ring 612, and the sensor ring 612 is mountable on the wheel 74, in particular on the hub housing 122, by means of the mounting ring 634.

In the embodiment according to FIG. 11, the mounting ring 634, which lies in the sensor ring plane 622 and thus in particular defines the sensor ring plane 622, is configured similarly to the mounting ring 272 of the brake disc 206, and therefore reference can be made fully to the explanations provided for said mounting ring.

The outer region 628 and the inner region 624 of the sensor ring 612 are connected for example to a plurality of retaining bars 644, wherein, in the exemplary embodiment, there are just as many retaining bars 644 provided as there are supporting bars 286 provided on the brake disc 206.

In the Figures, only some of the retaining bars $644_i$, . . . of the retaining bars 644 have been identified by way of example.

The retaining bars 644 run here at an incline to the direction 630 that is radial relative to the sensor ring axis 618 and are formed arcuately in particular.

Here, the retaining bars 644 are formed in a manner similar to the supporting bars 286 of the brake disc 206, and in particular the supporting bars 286 and the retaining bars 244 are shaped with the same width along the peripheral direction 116.

By way of example, each of the retaining bars 644 is supported on the mounting ring 634 by one of a plurality of auxiliary retaining bars 646, wherein in particular there is an auxiliary retaining bar 646 provided for each one of the retaining bars 644.

Only one auxiliary retaining bar $646_i$ of the plurality of auxiliary bars 646 has been identified in FIG. 11.

The sensing region 616 of the sensor ring 612 is arranged in the outer region 628.

Here, the sensing region 616 has a periodically varying structure 648 along the peripheral direction 632 around the sensor ring axis 618, which structure is detectable by the sensor 614, wherein the periodically varying structure 648 is rotationally symmetrical, more specifically in respect of a rotation of the sensing region 616 about the sensor ring axis 618 with an angle of 360°/m, wherein m is a natural number, such that m rotations by the angle 360°/m correspond to a full revolution of the sensing region 616 about the sensor ring axis 618 and in the exemplary embodiment m=56.

Here, the periodically varying structure 648 varies in terms of one of its properties within a period, for example in an angular range spanned by the angle 360°/m, and in particular the corresponding property changes abruptly.

In the exemplary embodiment according to FIG. 11, the sensing region 616 has a toothed structure, which is arranged peripherally around the sensor ring 612 substantially in the sensor ring plane 622, wherein the toothed structure forms the periodically varying structure 648.

Here, teeth 652, which are arranged periodically peripherally on the sensor ring 612 in the direction of the peripheral direction 632 and which extend in the direction 630 that is radial relative to the sensor ring axis 618, form the toothed structure, i.e. also the periodically varying structure 648.

Only some of the teeth $652_i$, . . . of the teeth 652 have been identified in the Figures.

The teeth 652 form a structure that is symmetrical with respect to a rotation about the sensor ring axis 618 with an angle of 360°/z, wherein z is a natural number and in the exemplary embodiment z corresponds to the number M=56 of teeth 652.

Here, the teeth 652 are formed from material bridges 656, wherein the material bridges 656 are arranged along the peripheral direction 632 in a periodically alternating manner between apertures 658 in the outer region 628 of the sensor ring 612, such that the periodically varying structure 648 varies in respect of the arranged material and in respect of the material density, and these structure-forming properties change here substantially abruptly.

Here, only some of the material bridges $656_i$, . . . of the material bridges 656 have been identified in the Figures, and only some of the apertures $658_i$, . . . of the apertures 658 have been identified by way of example.

The sensor ring 612 is folded over in the outer region 628 in the region of the material bridges 656, such that the toothed structure, in the direction that is axial relative to the sensor ring axis 618, has a thickness 662, wherein the thickness 662 is greater than a thickness 664 of the sensor ring 612 in a region not folded over, for example in the inner region 624, said thickness 664 also being based on the extent in the direction that is axial relative to the sensor ring axis 618, and in the exemplary embodiment the thickness 662 is approximately twice the thickness 664.

The teeth 652, i.e. in particular also the material bridges 656, are formed form a material that heavily influences a magnetic field, wherein the apertures 658 disposed between the material bridges 656 at most influence a magnetic field only weakly, such that a structure influencing a magnetic field to differing degrees in a periodically varying manner is formed, in which structure the degree to which the magnetic field is influenced varies periodically along the peripheral direction 632 around the sensor ring axis 618, and, since the axis of rotation 114 is oriented coaxially with the sensor ring axis 618, the degree to which the magnetic field is influenced thus varies on account of the periodically varying structure 648 along the peripheral direction 116 around the axis of rotation 114.

Here, in the case of the structure influencing a magnetic field to differing degrees in a periodically varying manner, the degree to which the magnetic field is influenced varies abruptly at a transition from one of the apertures 658 to one of the material bridges 656.

The sensor 614 detects the periodically varying structure 648 of the sensing region 616, and in particular the sensor 614 detects the material bridges 656 and the apertures 658, for example the transitions from the material bridges 656 to the apertures 658.

In the exemplary embodiment the sensor 614 is formed by way of example as a magnetic sensor, such that the structure of the sensing region 616 influencing a magnetic field to differing degrees in a periodically varying manner triggers a periodically varying signal in the event of a relative movement of said sensing region relative to the sensor 614.

By way of example, the sensor 614 is formed as a Hall sensor, such that different areas of the structure of the sensing region 616 influencing a magnetic field to differing degrees, in particular the arrangement of the alternately arranged material bridges 656 and apertures 658, generate a Hall voltage of differing magnitude in the sensor 614, and therefore the sensor 614 detects the periodically varying structure 648.

In a variant, the sensor 614 generates a magnetic field and detects how this magnetic field is influenced by magnetic-field-influencing structures which are arranged at a distance from the sensor 614, but not beyond a range 682 of said sensor.

Here, the sensor 614 comprises in particular a sensor surface 684, which is followed by a detection region 686, which lies outside the sensor 614 and extends substantially not beyond the range 682 starting from the sensor surface 684, wherein the sensor 614 detects magnetic-field-influencing structures within the detection region 686.

If, by way of example, an electric current flows through the sensor surface 684, wherein, on account of the Hall effect in the event of a magnetic field passing through the sensor surface 684, for example a magnetic field of differing strength on account of the structure influencing a magnetic field to differing degrees in a periodically varying manner, in particular the alternately arranged material bridges 656 and apertures 658, a Hall voltage is formed perpendicularly to a direction of flow of the electric current, and the sensor 614 detects the periodically varying structure 648, in particular the material bridges 656 and the apertures 658, by analysing this Hall voltage, the magnitude of which is dependent on the position of the structure influencing a magnetic field to differing degrees in a periodically varying manner relative to the sensor 614.

In a mounting position 702, the brake caliper 204 and the sensor 614 are mounted on the wheel suspension 72 in such a way that the brake caliper 204 is arranged so as to be able to cooperate in a braking manner with the brake ring 282 and the sensing region 616 is detectable by the sensor.

In the mounting position 702, the brake disc 206 and the sensor ring 612 are mounted on the hub housing 122 so that the brake disc 206 and the sensor ring 612, in the event of a rotation of the wheel 74 about the axis of rotation 114, co-rotate with the wheel 74, wherein the sensor ring 612 has the same rotational speed here as the wheel 74.

Here, in the mounting position 702, the axis of rotation 114, the brake disc axis 262, and the sensor ring axis 618 are oriented coaxially, i.e. in particular these axes coincide with one another in the mounting position 702.

Here, the sensor ring 612 and the brake disc 206 are oriented in such a way that the retaining bars 644 of the sensor ring 612 and the supporting bars 286 of the brake disc 206 cover one another, i.e. are oriented identically in the direction that is radial relative to the axis of rotation 114 and are adjacent to one another with respect to the direction that is axial relative to the axis of rotation 114.

Here, the sensor ring 612 is arranged between the brake disc 206 and the first annular collar 262I, which is arranged closer to the brake disc 206 on the hub housing 122 than the annular collar 262II, such that the brake disc 206, the sensor ring 612, the annular collar 146I with the spoke surface 148I, the wheel plane 112, and subsequently the annular collar 146II with the spoke surface 148II are arranged in this order along the direction that is axial relative to the axis of rotation 114, wherein a sprocket wheel 722 of the bicycle drive system 16 also follows on from the annular collar 146II in the case of the rear wheel 74h.

In particular, the sensor ring plane 622 runs between the brake disc plane 252 and the spoke surface 148I, and the brake disc plane 252 and the sensor ring plane 622 run here substantially parallel to one another, for example.

Here, the sensing region 616 is arranged in a region between the brake disc 206 and the spokes 108, wherein in particular the sensing region 616 lies between the brake disc plane 252 and the spoke surface 148I.

Here, the sensing region 616 is spaced from the axis of rotation 114 for example in the direction that is radial relative to the axis of rotation 114 and runs in the direction of the peripheral direction 116 around the axis of rotation 114.

The sensor 614 is arranged in the mounting position 702 in such a way that it is aligned, in particular via the sensor surface 684, with the sensing region 616 and is spaced from an area of the sensing region 616, for example an area arranged close, in particular closest, to the sensor 614, by a spacing that is shorter than the range 682 of the sensor 614, such that the area of the sensing region 616 lies in the detection region 686 of the sensor 614.

Here, the sensor 614 is arranged between the brake disc plane 252 and the spoke surface 148I and for example is arranged offset in relation to the sensor ring plane 622 in a direction oriented towards the spoke surface 148I, such that the sensor 614 is arranged in part with its sensor surface 684 next to the sensor ring 612, in particular next to the sensing region 616, in the direction that is axial relative to the axis of rotation 114, and such that the sensor surface 684 faces the sensing region 616.

The sensing region 616 of the sensor ring 612 and the sensor surface 684 of the sensor 614 face one another in the direction that is radial relative to the axis of rotation 114 so that the sensor 614 detects the periodically varying structure 648 of the sensing region 616 in the radial direction.

Since the sensor 614 is not distanced from an area of the sensing region 616 of the sensor ring 612 further than the range 682, the sensor 614 detects the magnetic-field-influencing effect of this area of the sensing region 616, which lies in the detection region 686 of the sensor 614. When the sensor ring 612 rotates with the wheel 74 about the axis of rotation 114, the magnetic-field-influencing effect of the area of the sensing region 616 which lies in the detection region 686, changes temporally periodically due to the structure of the sensing region 616 which influences a magnetic field to differing degrees in a periodically varying manner, wherein the temporal change to the magnetic-field-influencing effect of the sensing region 616 on the magnetic field of the sensor 614 detected by the sensor 614 is dependent on the rotational speed of the sensing region 616 about the axis of rotation 114 and therefore on the rotational speed of the wheel 74 about the axis of rotation 114, and therefore the rotational speed of the wheel 74 for the sensor 614 is determinable from the temporal change of the magnetic-field-influencing effect of the area of the sensing region 616 lying in the detection region 686.

The anti-lock braking system 18 comprises a control unit 804, which is connected to the sensor units 78v and 78h of the front and rear wheel units 12v and 12h in a signal-transmitting manner, and a pressure regulation unit 806, which is connected to the hydraulics system 208v of the front wheel unit 12v and, in a variant, is connected similarly to the hydraulics system 208h of the rear wheel unit 12h, so as to be able to regulate the pressure in the hydraulics system 208, wherein the control unit 804 actuates the pressure regulation unit 806 depending on the measured rotational speeds of the front wheel 74v and of the rear wheel 74h, which rotational speeds are determined by the sensor unit 78 and are transmitted to the control unit 806.

The control unit 804 of the anti-lock braking system 18 determines, from the rotational speeds of the wheels 74v and 74h transferred from the sensor units 78v and 78h, the difference between the two rotational speeds of the wheels 74 and from this determines, for example in the case of an excessively large deviation of the two rotational speed relative to one another, whether one of the wheels 74 has locked, i.e. no longer rotates or is only rotating slowly, compared with the other wheel 74, wherein the locking is caused by a heavy actuation of the actuation unit 202 of the braking device 76 and a resultant heavy braking effect of the brake caliper 204 on the brake disc 206 and therefore on the wheel 74.

For this purpose, the control unit 804 is connected to the sensor units 78v and 78h by way of example by means of electrically conductive cables, and the sensor units 78 transmit the rotational speed of the wheels 74 in the form of electrical pulses.

The control unit 804 is also connected to the pressure regulation unit 806 by way of example by means of an electrically conductive cable and transmits control commands for the pressure regulation unit 806 in the form of electrical pulses along the cable.

If the control unit 804 has determined a locking of the wheel 74, it actuates the pressure regulation unit 806, whereupon the pressure regulation unit 806 reduces the pressure in the hydraulics system 208 of the braking device 76, for example in that the pressure regulation unit 806 diverts hydraulic fluid from the hydraulics system 208 in part into a temporary store.

As a result of the pressure reduction in the hydraulics system 208 which is brought about by the pressure regulation unit 806, the pistons 246 and 248 act on the brake pads 242 and 244 to a lesser extent and consequently press the brake pads 242 and 244 less strongly against the brake disc 206, such that the friction thereon decreases and the locking of the wheel 74 is released and the wheel 74 rolls again.

The bicycle drive system 16 comprises the sprocket wheel 722, which is arranged on the hub housing 122h of the rear wheel unit 12h, a chainwheel 852, and a chain 542, which is tensioned movably between the sprocket wheel 722 and the chainwheel 852, such that a rotational movement is transferred from the chainwheel 852 by the chain 854 to the sprocket wheel 722, and also comprises pedals 856 and 858, as is illustrated in FIG. 1.

Here, the chainwheel 852 is arranged rotatably on the frame 14, and the pedals 856 and 858 are connected to the chainwheel 852, such that the rider, who pedals on the pedals 856 and 858 and thus brings the chainwheel 852 into rotation, drives the rear wheel 74*h* to move in rotation as a result of the fact that the rotational movement of the chainwheel 852 brought about by the rider is transferred via the chain 854 to the sprocket wheel 722 and thus to the hub housing 122*h*.

In a second exemplary embodiment of a wheel unit 12' according to the invention, illustrated in FIGS. 13 to 17, those parts which are identical to those of the first exemplary embodiment are provided with the same reference signs, and therefore, with regard to the description of said parts, reference can be made fully to the explanations provided for the first exemplary embodiment.

In the second exemplary embodiment, the sensor ring 612' extends via its inner region 624 in the sensor ring plane 622, which is defined by the mounting ring 634 arranged in the inner region 624, and the sensing region 616' runs annularly in the outer region 628 and extends in the direction that is axial relative to the sensor ring axis 618, starting from the sensor ring plane 622.

Here, a toothed structure of the sensing region 616' runs peripherally around the sensor ring 612', and the teeth 652' are oriented in the direction that is axial relative to the sensor ring axis 618 and extend in an elongate manner in the direction that is axial relative to the sensor ring axis 618.

The sensing region 616' thus runs in a strip-like manner around the sensor ring axis 618, wherein the width of the strip-like sensing region 616' corresponds approximately to the length of the teeth extending in an elongate manner in the direction that is axial relative to the sensor ring axis 618, and the elongate extent of the strip-like sensing region 616' corresponds to the extent of the toothed structure in the direction of the peripheral direction 632 around the sensor ring axis 618, i.e. in particular the periphery of the toothed structure.

In the mounting position 702', the sensor ring 612' is arranged between the brake disc 206 and the spokes 108, in particular the spoke surface 148I, such that the sensing region 616' is also arranged between the brake disc 206 and the spokes 108, in particular the spoke surface 148I.

In a variant, provision is made that the sensor ring 612' is arranged with its inner region 624, in particular with the mounting ring 634, in such a way that the brake disc 206 is arranged between the inner region 624, in particular the mounting ring 634, of the sensor ring 612' and the spokes 108, in particular the spoke surface 148I, and in such a way that the teeth 652' pass through openings in the brake disc 206 into the space between the brake disc 206 and the spokes 108, in particular the spoke surface 148I, and therefore the sensing region 616' is arranged between the brake disc plane 252 and the spoke surface 148I.

The sensor 614' is arranged on the brake caliper housing 232' in such a way that the sensor 614' is aligned via its sensor surface 684' with the sensing region 616', such that the detection region 686' extends away from the sensor 614', from the sensor surface 684' in the direction 630 that is radial relative to the sensor ring axis 618.

The sensor surface 684' and an area of the sensing region 616' facing the sensor surface 684' thus face one another in the direction 630 that is radial relative to the sensor ring axis 618.

The sensor 614' thus scans the sensing region 616' in the direction 630 that is radial relative to the sensor ring axis 618.

For this purpose, the sensor 614' is arranged in particular between the brake disc plane 252 and the spokes 108, for example the spoke surface 148I, and in the exemplary embodiment according to FIGS. 14 to 17 the sensor 614' is arranged radially offset in relation to the sensor ring 612' in the direction that is radial relative to the axis of rotation 114, which is oriented coaxially with the sensor ring axis 618.

Figure 18:
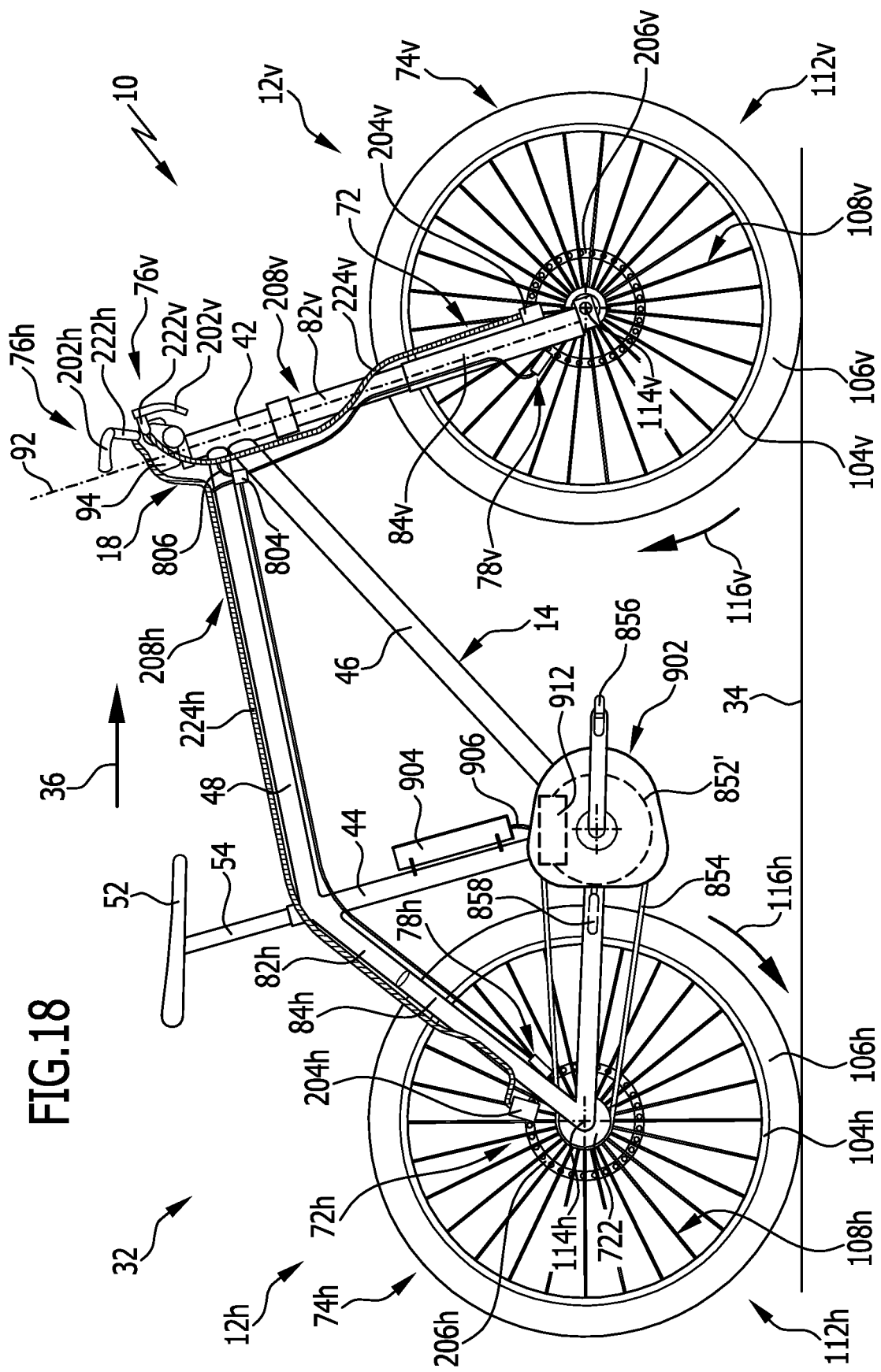
FIG. 18 shows a side view of a second exemplary embodiment of a bicycle according to the invention.

In a third exemplary embodiment of a solution according to the invention, illustrated in FIG. 18, those parts which are identical to those in any one of the previous exemplary embodiments are provided with the same reference signs, and therefore, with regard to the description of said parts, reference can be made fully to the explanations provided in conjunction with the previous exemplary embodiments.

In the third exemplary embodiment, the bicycle 10' according to the invention comprises an auxiliary drive 902, which is supplied with energy from a power source 904 via a power transfer element 906.

In the exemplary embodiment the power source 904 is a secondary battery, i.e. a rechargeable store for electrical energy, and the auxiliary drive 902 is supplied with electrical power via the energy transfer element 906 formed as a cable.

In a variant, provision is made that the power source 904 comprises a fuel cell which generates electrical power and by means of which the auxiliary drive 902 is supplied with power.

In a further variant the power source 904 comprises a solar cell which generates electrical power and by means of which the auxiliary drive 902 is supplied with power.

The auxiliary drive 902 comprises an electric drive motor 912, and a chainwheel 852' is integrated in the auxiliary drive 902 and is connected rotatably to the electric drive motor 912 for example via a first shaft and is connected rotatably to the pedals 856 and 858 by means of a second shaft, such that the electric drive motor 912 sets the chainwheel 852' in rotation via the first shaft and thus sets the sprocket wheel 722 in rotation via the chain 854 and thus drives the rear wheel 74*h*, and the rider of the bicycle 10', via the pedals 856 and 858, can set the chainwheel 852' in rotation in a similar manner via the second shaft and can thus also drive the rear wheel 74*h*.

For the rest, all further parts are identical to those from one of the previous exemplary embodiments, and therefore reference can be made fully to the explanations provided in conjunction with these exemplary embodiments.

The invention claimed is:

1. Wheel unit for a bicycle, comprising a hub and a wheel rim, which is arranged rotatably about an axis of rotation, wherein the hub and the wheel rim are connected to one another by spokes,
   a brake disc and a sensor ring, which comprises a sensing region, are arranged on the hub, and in that the sensing region is positioned between the brake disc and the spokes, wherein the brake disc and sensor ring are arranged on the hub radially inside of the sensing region relative to the axis of rotation.

2. Wheel unit according to claim 1, wherein supporting bars of the brake disc carry a brake ring of the brake disc.

3. Wheel unit according to claim 1, wherein the brake disc extends substantially in a brake disc plane and the spokes run substantially in a spoke surface, wherein the sensing region is arranged between the brake disc plane and the spoke surface.

4. Wheel unit according to claim 1, wherein the brake disc extends substantially in a brake disc plane and the spokes run substantially in a spoke surface, wherein the sensor ring is arranged on the hub between the brake disc plane and the spoke surface.

5. Wheel unit according to claim 1, wherein the sensor ring extends substantially in a sensor ring plane which runs perpendicularly to a sensor ring axis.

6. Wheel unit according to claim 5, wherein the sensor ring stands out from the sensor ring plane in the sensing region.

7. Wheel unit according to claim 1, wherein the sensing region runs in a sensor ring plane.

8. Wheel unit according to claim 1, wherein the sensor ring, in the sensing region, has a structure that varies periodically along a peripheral direction around the axis of rotation.

9. Wheel unit according to claim 8, wherein the periodically varying structure in the sensing region is configured so as to influence a magnetic field to differing degrees in a periodically varying manner along the peripheral direction around the axis of rotation.

10. Wheel unit according to claim 1, wherein the sensor ring, in the sensing region, has a structure that is periodically toothed along a peripheral direction around the axis of rotation.

11. Wheel unit according to claim 1, wherein a structure in the sensing region influencing a magnetic field to differing degrees in a periodically varying manner is formed as a periodically toothed structure.

12. Wheel unit according to claim 11, wherein the periodically toothed structure in the sensing region is formed by apertures and teeth arranged periodically in alternation along a peripheral direction around the axis of rotation.

13. Wheel unit according to claim 12, wherein the teeth extend in an elongate manner in a direction that is radial relative to the axis of rotation.

14. Wheel unit according to claim 12, wherein the teeth extend in an elongate manner in a sensor ring plane.

15. Wheel unit according to claim 12, wherein the teeth extend in an elongate manner in a direction that is axial relative to the axis of rotation.

16. Wheel unit according to claim 1, wherein retaining bars of the sensor ring hold the sensing region of the sensor ring on a mounting ring of the sensor ring.

17. Wheel unit according to claim 1, wherein the wheel unit comprises a sensor for detecting the sensing region.

18. Wheel unit according to claim 17, wherein the sensor detects a periodically varying structure in the sensing region.

19. Wheel unit according to claim 17, wherein the sensor detects the sensing region in the direction that is radial relative to the axis of rotation.

20. Wheel unit according to claim 17, wherein the sensor detects the sensing region in a direction that is axial relative to the axis of rotation.

21. Wheel unit according to claim 17, wherein the sensor is arranged offset in relation to the sensing region in a direction that is radial relative to the axis of rotation.

22. Wheel unit according to claim 17, wherein the sensor is arranged offset in relation to the sensing region in the direction that is axial relative to the axis of rotation.

23. Wheel unit according to claim 1, wherein the wheel unit comprises a brake caliper, wherein the brake caliper and the brake disc are configured to cooperate in a braking manner.

24. Wheel unit according to claim 23, wherein the wheel unit comprises a sensor for detecting the sensing region, and wherein the sensor is arranged on the brake caliper.

25. Wheel unit according to claim 1, wherein the wheel unit comprises a wheel suspension on which the hub is arranged rotatably about the axis of rotation.

26. Bicycle comprising a front wheel unit and a rear wheel unit, wherein the wheel units are connected to a frame, wherein at least one of the wheel units of the bicycle is in accordance with claim 1.

27. Bicycle according to claim 26, wherein the front wheel unit is formed in accordance with claim 1 and the rear wheel unit is in accordance with claim 1.

28. Bicycle according to claim 26, wherein the bicycle comprises a muscle-driven bicycle drive system.

29. Bicycle according to claim 26, wherein the bicycle comprises an auxiliary drive.

30. Bicycle according to claim 29, wherein the auxiliary drive comprises an electric drive motor.

31. Wheel unit according to claim 1, wherein the brake disc and sensor ring are mounted to the hub via at least one fastening element.

32. Wheel unit for a bicycle, comprising a hub and a wheel rim, which is arranged rotatably about an axis of rotation, wherein the hub and the wheel rim are connected to one another by spokes,
 a brake disc and a sensor ring, which comprises a sensing region, are arranged on the hub, and in that the sensing region is positioned between the brake disc and the spokes;
 wherein the sensor ring extends substantially in a sensor ring plane which runs perpendicularly to a sensor ring axis; and
 wherein the sensing region runs transversely to the sensor ring plane.

33. Wheel unit for a bicycle, comprising a hub and a wheel rim, which is arranged rotatably about an axis of rotation, wherein the hub and the wheel rim are connected to one another by spokes,
 a brake disc and a sensor ring, which comprises a sensing region, are arranged on the hub, and in that the sensing region is positioned between the brake disc and the spokes;
 wherein the sensor ring, in the sensing region, has a thickness which is based on an extent of the sensor ring in a direction that is axial relative to the axis of rotation and which is thicker than a thickness in an inner region of the sensor ring, which is arranged radially inwardly relative to the sensing region in relation to the axis of rotation.

34. Wheel unit according to claim 33, wherein the sensor ring is folded over in the sensing region.

35. Wheel unit for a bicycle, comprising a hub and a wheel rim, which is arranged rotatably about an axis of rotation, wherein the hub and the wheel rim are connected to one another by spokes,
 a brake disc and a sensor ring, which comprises a sensing region, are arranged on the hub, and in that the sensing region is positioned between the brake disc and the spokes;
 wherein a structure in the sensing region influencing a magnetic field to differing degrees in a periodically varying manner is formed as a periodically toothed structure;
 wherein the periodically toothed structure in the sensing region is formed by apertures and teeth arranged periodically in alternation along a peripheral direction around the axis of rotation; and
 wherein the teeth extend in an elongate manner transversely to a sensor ring plane.

36. Wheel unit for a bicycle, comprising a hub and a wheel rim, which is arranged rotatably about an axis of rotation, wherein the hub and the wheel rim are connected to one another by spokes,
- a brake disc and a sensor ring, which comprises a sensing region, are arranged on the hub, and in that the sensing region is positioned between the brake disc and the spokes;
- wherein retaining bars of the sensor ring hold the sensing region of the sensor ring on a mounting ring of the sensor ring;
- wherein the retaining bars of the sensor ring and supporting bars of the brake disc cover one another in a direction that is axial relative to the axis of rotation.

37. Wheel unit for a bicycle, comprising a hub and a wheel rim, which is arranged rotatably about an axis of rotation, wherein the hub and the wheel rim are connected to one another by spokes,
- a brake disc and a sensor ring, which comprises a sensing region, are arranged on the hub, and in that the sensing region is positioned between the brake disc and the spokes;
- wherein the wheel unit comprises a sensor for detecting the sensing region; and
- wherein the sensor is arranged between the brake disc and the spokes.

38. Wheel unit for a bicycle, comprising a hub and a wheel rim, which is arranged rotatably about an axis of rotation, wherein the hub and the wheel rim are connected to one another by spokes,
- a brake disc and a sensor ring, which comprises a sensing region, are arranged on the hub, and in that the sensing region is positioned between the brake disc and the spokes;
- wherein the wheel unit comprises a wheel suspension on which the hub is arranged rotatably about the axis of rotation;
- wherein the wheel unit comprises a sensor for detecting the sensing region, and wherein the sensor is arranged on the wheel suspension.

* * * * *